US007379059B2

(12) United States Patent
Odake et al.

(10) Patent No.: US 7,379,059 B2
(45) Date of Patent: May 27, 2008

(54) DISPLAY APPARATUS, DISPLAY METHOD, LIQUID CRYSTAL DRIVER CIRCUIT AND LIQUID CRYSTAL DRIVING METHOD

(75) Inventors: Ryota Odake, Tokyo (JP); Toshitaka Kawashima, Kanagawa (JP); Mitsunori Ueda, Tokyo (JP)

(73) Assignee: Sony Corporation, Tokyo (JP)

( * ) Notice: Subject to any disclaimer, the term of this patent is extended or adjusted under 35 U.S.C. 154(b) by 605 days.

(21) Appl. No.: 11/000,242

(22) Filed: Nov. 30, 2004

(65) Prior Publication Data

US 2005/0156846 A1 Jul. 21, 2005

(30) Foreign Application Priority Data

Dec. 24, 2003 (JP) ............................. 2003-426203

(51) Int. Cl.
*G06F 3/038* (2006.01)
*G09G 3/36* (2006.01)

(52) U.S. Cl. .......................... 345/214; 345/30; 345/50; 345/55; 345/87; 345/204

(58) Field of Classification Search .................. 345/19, 345/30, 33, 37, 50, 84, 87, 94, 96, 97, 204, 345/208, 209, 210, 214, 44, 45, 46, 48, 60, 345/71, 76, 77, 78, 79, 80, 81; 349/19, 33, 349/37

See application file for complete search history.

(56) References Cited

U.S. PATENT DOCUMENTS

| | | | | |
|---|---|---|---|---|
| 6,278,429 | B1 * | 8/2001 | Ruth et al. | 345/94 |
| 6,602,563 | B2 * | 8/2003 | Kobayashi et al. | 428/1.3 |
| 6,812,913 | B2 * | 11/2004 | Masazumi et al. | 345/94 |
| 6,911,965 | B2 * | 6/2005 | Miller, IV | 345/94 |
| 2003/0174112 | A1 * | 9/2003 | Jones | 345/94 |
| 2006/0267890 | A1 * | 11/2006 | Odake et al. | 345/87 |

* cited by examiner

*Primary Examiner*—My-Chau T. Tran
(74) *Attorney, Agent, or Firm*—Wolf, Greenfield & Sacks, P.C.

(57) ABSTRACT

A display apparatus displays information by changing a state of cholesteric liquid crystal with a first driver applying a bipolar voltage to the first electrode, and a second driver for applying a bipolar voltage to the second electrode, the bipolar voltage being of inverted characteristics of the bipolar voltage to be applied to the first electrode. The display apparatus includes a controller controlling the first driver to apply the bipolar voltage to the first electrode a plurality of times in a predetermined period and controlling the second driver to apply to the second electrode the bipolar voltage of the inverted characteristics of the bipolar voltage to be applied to the first electrode, at a same timing as an application of the bipolar voltage to the first electrode, whereby changing a state of cholesteric liquid crystal of a predetermined pixel to a predetermined state.

2 Claims, 15 Drawing Sheets

PRIOR ART

PRIOR ART

PRIOR ART

PRIOR ART

PRIOR ART

DISPLAY APPARATUS, DISPLAY METHOD, LIQUID CRYSTAL DRIVER CIRCUIT AND LIQUID CRYSTAL DRIVING METHOD

CROSS REFERENCES TO RELATED APPLICATIONS

The present invention claims priority to its priority document No. 2003-426203 filed in the Japanese Patent Office on Dec. 24, 2003, the entire contents of which being incorporated by reference herein.

BACKGROUND OF THE INVENTION

1. Field of the Invention

The present invention relates to a display apparatus and a display method, and a liquid crystal driver circuit and a liquid crystal driving method, and more particularly to a display apparatus and a display method, and a liquid crystal driver circuit and a liquid crystal driving method, suitable for displaying information by using cholesteric liquid crystal.

2. Description of the Related Art

A liquid crystal display apparatus utilizes, for example, TN (Twisted Nematic) liquid crystal and STN (Super Twisted Nematic) liquid crystal of a simple matrix type, TFT (Thin Film Transistor) liquid crystal and MIM (Metal In Metal) liquid crystal of an active matrix type.

In the simple matrix type, X electrodes and Y electrodes are disposed in a matrix shape and these electrodes are turned ON/OFF at proper timings to drive liquid crystal in a cross portion. A liquid crystal display apparatus of the simple matrix type is generally lower in price than a product using the active matrix type, because of easy manufacture and a high yield resulting from a small number of electrodes and simple structure. However, since the electrode of a liquid crystal constituting a pixel is not independent, there is voltage interference and nearby cells are influenced so that each pixel is difficult to be displayed clearly. On the other hand, as different from the simple matrix type, the active matrix type switches between on and off for each pixel (an active element is added to each pixel to drive liquid crystal). As compared to the simple matrix type, although the active matrix type is excellent in the performances such as a faster response time, a small after-image and a broad angle of visibility, its manufacture cost is high.

In order to retain displaying information on a display apparatus utilizing the above-described liquid crystal, it is necessary to continue to apply voltage to the liquid crystal. As voltage is applied to the liquid crystal for a predetermined time, an after-image phenomenon called "burn-in" occurs. In order to prevent the burn-in, for example, frame inversion techniques are used which invert the voltage to be applied to a pixel electrode, at a predetermined period. If polarity inversion techniques such as frame inversion are adopted, an amplitude of voltage to be applied to a signal line is required to be twice as high as that of a monopolar drive. Common inversion techniques or the like are used in order to halve the voltage amplitude to be applied to the signal line.

In contrast to the liquid crystal display apparatus described above, in a liquid crystal display apparatus using cholesteric liquid crystal, the state transits (between a planar state and a focalconic state) depending upon an applied voltage. By using this, information can be displayed and the information once displayed can be retained without supplying a power (e.g., see "Liquid Crystal Device Handbook", published by the Nikkan Kogyo Shimbun, Ltd., Sep. 29, 1989, pp. 352 to 355).

Cholesteric liquid crystal selectively reflects light having a wavelength corresponding to a pitch of liquid crystal spiral layers in the planar state and becomes almost transparent in the focalconic state.

With reference to FIGS. 1 and 2, the structure of a cholesteric liquid crystal panel 1 will be described. FIG. 1 is a cross sectional view of a cholesteric liquid crystal panel 1, and FIG. 2 is a diagram illustrating the structure of two electrodes of the cholesteric liquid crystal panel 1.

Transparent column electrodes (ITO: Indium Tin Oxide) 12 are disposed in a stripe shape on a glass substrate 11-1 by vapor deposition (or sputtering), whereas transparent row electrodes (ITO: Indium Tin Oxide) 15 are disposed in a stripe shape on a glass substrate 11-1 by vapor deposition (or sputtering). Polyimide layers 13-1 and 13-2 of about several μm in thickness are disposed on the side of the glass substrates 11-1 and 11-2 where the transparent column electrodes 12 and transparent row electrodes 15 are vapor-deposited (or sputtered).

The glass substrates 11-1 and 11-2 are adhered together by a gap member or the like at a gap thickness of several μm (e.g., about 5 μm) in such a manner that the stripes of the transparent column electrodes 12 cross and face the stripes of the transparent row electrodes 15 via the polyimide layers 13-1 and 13-2. Cholesteric liquid crystal is injected into the gap between the glass substrates 11-1 and 11-2, for example, by a vacuum injection method to form a cholesteric liquid crystal film 14.

It is not necessary for the cholesteric liquid crystal panel 1 to orientate the polyimide layers and to mount a polarizing plate on the glass substrate, as in the case of generally used TN (Twisted Nematic) liquid crystal.

A molecular structure of cholesteric liquid crystal is a special helical structure (spiral structure). Since the helical structure changes with the value of an applied bipolar pulse voltage, the state changes. As shown in FIG. 3, cholesteric liquid crystal can take two stable states of a focalconic state and a planar state, depending on the value of an applied bipolar pulse voltage. The planar state is the state that makes a specific wavelength range of light be subjected to interference scattering, and the focalconic state is the state that light is transmitted over a broad range.

Information can therefore be displayed on the cholesteric liquid crystal panel 1 in a first color determined by a wavelength range in which light is reflected in the planar state and a second color viewed through the liquid crystal display when liquid crystal is transparent in the focalconic state. Namely, for example, a monotone of a specific wavelength color and a black color can be displayed on the cholesteric liquid crystal panel 1 by making cholesteric liquid crystal irregularly reflect light in the specific wavelength range in the planar state and coloring a portion under the cholesteric liquid crystal layer 14 in black and making the black color to be transmitted and viewed in the focalconic state.

As shown in FIG. 3, a voltage Vps of a bipolar pulse voltage necessary for changing the state of cholesteric liquid crystal to the planar state is approximately a twofold of a voltage Vfs of a bipolar pulse voltage necessary for changing the state to the focalconic state.

As a bipolar pulse voltage is applied to a predetermined pixel electrode, the cholesteric liquid crystal takes the focalconic state or the planar state, and if a voltage is not applied thereafter, the state is maintained. As a bipolar voltage pulse is applied again if necessary, the cholesteric liquid crystal can change its state in accordance with the applied voltage value. Namely, the cholesteric liquid crystal panel 1 using cholesteric liquid crystal can retain the information displayed upon application of a bipolar voltage pulse, without being supplied with a power thereafter.

FIG. 4 shows examples of a drive voltage waveform to be applied to a pixel electrode when a display of a predetermined pixel of the cholesteric liquid crystal panel 1 is to be changed. If a bipolar pulse having a voltage Vps is applied to a predetermined pixel electrode in the focalconic state, the state is changed to the planar state so that the display color is the first color, whereas if a bipolar pulse having a voltage Vfs is applied to a predetermined pixel electrode in the planar state, the state is changed to the focalconic state so that the display color is changed from the first color to the second color.

In the cholesteric liquid crystal panel 1, for example, as a bipolar pulse voltage having the voltage value Vps is applied to the whole panel, the whole display area enters the planar state and the displayed information is reset once, thereafter, as a bipolar pulse voltage of the voltage pulse Vfs is applied to a pixel electrode at a necessary position, predetermined information can be displayed and the displayed information can be retained without applying a voltage thereafter.

FIG. 5 is a block diagram showing an example of the structure of a typical liquid crystal driver circuit 21 of related art for driving cholesteric liquid crystal panel 1. Description will be made herein assuming that the cholesteric liquid crystal panel 1 displays n×m pixel information.

A column driver 31 is a driver which is supplied with a clock (CLK) signal and a data (DATA) signal representative of information to be displayed on the cholesteric liquid crystal panel 1, connected to drive voltages ±V2 and GND (0 V), and applies predetermined voltages to column (signal) electrodes Y1 to Yn of the transparent column electrodes 12 of the cholesteric liquid crystal panel 1, at predetermined timings to be described later with reference to FIG. 7.

A row driver 32 is a driver which is supplied with the clock (CLK) signal, connected to drive voltages ±V1 and the same GND as the GND supplied to the column driver 31, and applies predetermined voltages to row (scan) electrodes X1 to Xn of the transparent row electrodes 15 of the cholesteric liquid crystal panel 1, at predetermined timings to be described later with reference to FIG. 7.

The drive voltages V1 and V2 have the voltage values satisfying V1+V2>Vps.

Next, description will be made on a specific example of displaying 3×3, 9 pixels in two colors (two colors, a specific wavelength color and a black color, for example, if the specific wavelength color is green, pixels are displayed in two colors of green and black).

For example, as shown in FIG. 6, description will be made on displaying six pixels (X1, Y1), (X1, Y2), (X2, Y2), (X2, Y3), (X3, Y2) and (X3, Y3) among 3×3, 9 pixels in black and the other pixels in the specific wavelength color. The specific wavelength color is displayed in the state that cholesteric liquid crystal in the planar state makes light of the specific wavelength color be subjected to interference scattering, whereas the black color is displayed by transmission through the transparent cholesteric liquid crystal in the focalconic state.

FIGS. 7 and 8 are timing charts illustrating the operations of the column driver 31 and row driver 32. FIG. 7 is the timing chart illustrating voltages and timings of a bipolar pulse applied to the column electrodes X1 to X3 by the column driver 31 and voltages and timings of a bipolar pulse applied to the row electrodes Y1 to Y3 by the row driver 32, in order to display information of 3×3, 9 pixels shown in FIG. 6. FIG. 8 is a timing chart illustrating bipolar pulses applied across pixel electrodes of (X1, Y1) to (X3, Y3) of 3×3, 9 pixels (across electrodes at cross points of the transparent column electrodes 12 and transparent row electrodes 15), by using the applied voltages described with reference to FIG. 7.

First, in order to reset presently retained information, as shown in FIG. 7 a bipolar pulse of a voltage V1 is applied to the column electrodes Y1 to Y3 and a bipolar pulse of a voltage −V2 is applied to the row electrodes X1 to X3. Therefore, as shown in FIG. 8, a bipolar pulse of (V1+V2) is applied across pixel electrodes corresponding to pixels (X1, Y1) to (X3, Y3). Since V1+V2>Vps, the cholesteric liquid crystal layer 14 between two electrodes, the transparent column electrode 12 and transparent row electrode 15, enters the planar state and makes the specific wavelength light be subjected to interference scattering. Namely, the specific wavelength color is displayed on all pixels (X1, Y1) to (X3, Y3) (hereinafter called all planar reset).

Thereafter, as shown in FIG. 7, the row driver 32 sequentially scans the row electrodes X1, X2 and X3 and applies a bipolar pulse having a voltage V3 to select one of the row electrodes. In correspondence with the select timing of the row electrode, the column driver 31 selectively applies a bipolar pulse −V4 of inverted characteristics to the column electrodes Y1 to Y3. It is assumed herein that V3+V4>Vfs, V1>V3 and V2>V4.

As shown in FIG. 8, a bipolar pulse voltage of V3+V4>Vfs is applied to the six pixels (X1, Y1), (X1, Y2), (X2, Y2), (X2, Y3), (X3, Y2) and (X3, Y3) corresponding to the pixel electrodes of the row and column electrodes to which the bipolar pulses are applied at the same timing. Therefore, the cholesteric liquid crystal layer 14 between two electrodes of the transparent column electrode 12 and transparent row electrode 15 at the corresponding position enters the focalconic state and becomes transparent. Namely, the six pixels (X1, Y1), (X1, Y2), (X2, Y2), (X2, Y3), (X3, Y2) and (X3, Y3) are displayed in black.

Since V3+V4>Vfs and the voltage value Vps is approximately a twofold of the voltage value Vfs, V1+V2>V3+V4 is satisfied.

In this manner, information can be displayed on the cholesteric liquid crystal panel 1 by changing a desired pixel from a specific wavelength color to a black color after all planar reset.

SUMMARY OF THE INVENTION

The bipolar pulse voltage Vps for changing to the planar state and the bipolar pulse voltage Vfs for changing to the focalconic state change with a gap thickness between electrodes. For example, if the gap thickness is 5 μm, Vps is about 40 V and Vfs is about 20 V. Namely, in order to display desired information on the cholesteric liquid crystal panel 1, a bipolar pulse voltage Vps=40 V is applied to all pixel positions to execute all planar reset and thereafter, a bipolar pulse voltage Vfs=20 V is applied to a desired pixel position to change to the focalconic state.

However, a reflectivity/transmissivity of cholesteric liquid crystal after all planar reset changes slightly between a pixel position in the planar state before resetting and a pixel position in the focalconic state before resetting. When the bipolar pulse voltage Vfs is applied to desired pixel positions, it is desired that these pixels have a uniform focalconic state. Even if the bipolar pulse voltage Vfs is applied to the cholesteric liquid crystal having slightly different reflectivities/transmissivities at pixel positions, the reflectivities/transmissivities of the cholesteric liquid crystal become slightly different at pixel positions. Therefore, the display on the cholesteric liquid crystal panel 1 may have an insufficient contrast or may become not uniform.

It is desirable to improves the contrast of a display using cholesteric liquid crystal and allows information to be displayed uniformly. The present invention has been made in consideration of the above circumstances, and other issues associated with the related art.

A display apparatus according to an embodiment of the present invention includes: display means for displaying information by changing a state of cholesteric liquid crystal by applying voltage to first and second electrodes; first driving means for applying a bipolar voltage to the first electrode; and second driving means for applying a bipolar voltage to the second electrode, the bipolar voltage being of inverted characteristics of the bipolar voltage to be applied to the first electrode. Further, the display apparatus includes control means for controlling the first driving means to apply the bipolar voltage to the first electrode a plurality of times in a predetermined period and controlling the second driving means to apply to the second electrode the bipolar voltage of the inverted characteristics of the bipolar voltage to be applied to the first electrode, at a same timing as an application of the bipolar voltage to the first electrode, so as to change a state of cholesteric liquid crystal of a predetermined pixel to a predetermined state.

The predetermined state may be a reset state, and the control means may control the first driving means to apply a first bipolar voltage to the first electrode the plurality of times in the predetermined period and control the second driving means to apply a second bipolar voltage to the second electrode at the same timing as an application of the first bipolar voltage to the first electrode, so as to reset a display of a predetermined pixel of the cholesteric liquid crystal.

Alternatively, the predetermined state may be a state of displaying information, and the control means may control the first driving means to apply a first bipolar voltage to the first electrode the plurality of times in the predetermined period and control the second driving means to apply a second bipolar voltage to the second electrode at the same timing as an application of the first bipolar voltage to the first electrode, so as to change a display of a predetermined pixel of the cholesteric liquid crystal from a reset state to the state of displaying information.

The display means may have a plurality of cholesteric liquid crystals reflecting light in different wavelength ranges in a planar state.

A display method according to an embodiment of the present invention includes a first voltage application step of applying a first bipolar voltage to a first electrode a plurality of times in a first predetermined period and applying a second bipolar voltage to a second electrode at a same timing as an application of the first bipolar voltage to the first electrode, the second bipolar voltage being of inverted characteristics of the first bipolar voltage.

The display method may further include a second voltage application step of applying to the first electrode a third bipolar voltage different from the first and second bipolar voltages once in a second predetermined period different from the first predetermined period and applying to the second electrode a fourth bipolar voltage of the inverted characteristics of the third bipolar voltage at a same timing as an application of the third bipolar voltage to the first electrode.

The display method may further include a second voltage application step of applying to the first electrode a third bipolar voltage different from the first and second bipolar voltages a plurality of times in a second predetermined period different from the first predetermined period and applying to the second electrode a fourth bipolar voltage of the inverted characteristics of the third bipolar voltage at a same timing as an application of the third bipolar voltage to the first electrode.

In the display apparatus and display method according to the embodiments of the present invention, the bipolar voltage is applied to the first electrode the plurality of times in the predetermined period and the bipolar voltage of the inverted characteristics of the bipolar voltage to be applied to the first electrode is applied to the second electrode at the same timing as the application of the bipolar voltage to the first electrode, to thereby display information by changing the state of the cholesteric liquid crystal.

A liquid crystal driver circuit according to an embodiment of the present invention includes: first driving means for applying a bipolar voltage to a first electrode; second driving means for applying a bipolar voltage to the second electrode, the bipolar voltage being of inverted characteristics of the bipolar voltage to be applied to the first electrode; and control means for controlling operations of the first and second driving means. In the liquid crystal driver circuit, the control means controls the first driving means to apply the bipolar voltage to the first electrode a plurality of times in a predetermined period and controlling the second driving means to apply to the second electrode the bipolar voltage of the inverted characteristics of the bipolar voltage to be applied to the first electrode, at a same timing as an application of the bipolar voltage to the first electrode, so as to change a state of cholesteric liquid crystal of a predetermined pixel to a predetermined state.

The predetermined state may be a reset state, and the control means may control the first driving means to apply a first bipolar voltage to the first electrode the plurality of times in the predetermined period and control the second driving means to apply a second bipolar voltage to the second electrode at the same timing as an application of the first bipolar voltage to the first electrode, so as to reset a display of a predetermined pixel of the cholesteric liquid crystal.

Alternatively, the predetermined state may be a state of displaying information, and the control means may control the first driving means to apply a first bipolar voltage to the first electrode the plurality of times in the predetermined period and control the second driving means to apply a second bipolar voltage to the second electrode at the same timing as an application of the first bipolar voltage to the first electrode, so as to change a display of a predetermined pixel of the cholesteric liquid crystal from a reset state to the state of displaying information.

A liquid crystal display method according to an embodiment of the present invention includes: a first voltage application step of applying a first bipolar voltage to a first electrode a plurality of times in a first predetermined period and applying a second bipolar voltage to a second electrode at a same timing as an application of the first bipolar voltage to the first electrode, the second bipolar voltage being of inverted characteristics of the first bipolar voltage.

The liquid crystal driving method may further include a second voltage application step of applying to the first electrode a third bipolar voltage different from the first and second bipolar voltages once in a second predetermined period different from the first predetermined period and applying to the second electrode a fourth bipolar voltage of the inverted characteristics of the third bipolar voltage at a same timing of an application of the third bipolar voltage to the first electrode.

Alternatively, the liquid crystal driving method may further include a second voltage application step of applying to the first electrode a third bipolar voltage different from the first and second bipolar voltages a plurality of times in a second predetermined period different from the first predetermined period and applying to the second electrode a fourth bipolar voltage of the inverted characteristics of the third bipolar voltage at a same timing of an application of the third bipolar voltage to the first electrode.

In the liquid crystal display driver circuit and driving method according to the embodiments of the present invention, the bipolar voltage is applied to the first electrode the plurality of times in the predetermined period and the bipolar voltage of the inverted characteristics of the bipolar voltage to be applied to the first electrode is applied to the second electrode at the same timing as the application of the bipolar voltage to the first electrode.

According to the embodiments of the present invention, information is displayed by utilizing changes of the state of cholesteric liquid crystal, and a display contrast and uniformity can be improved.

According to the embodiments of the present invention, liquid crystal may be driven so as to display information by changing the state of cholesteric liquid crystal, and liquid crystal can be driven so as to improve a display contrast and uniformity.

BRIEF DESCRIPTION OF THE DRAWINGS

The above and other objects, features and advantages of the present invention will become more apparent from the following description of the presently exemplary embodiment of the invention taken in conjunction with the accompanying drawings, in which.

DETAILED DESCRIPTION OF THE EMBODIMENTS

Figure 9:
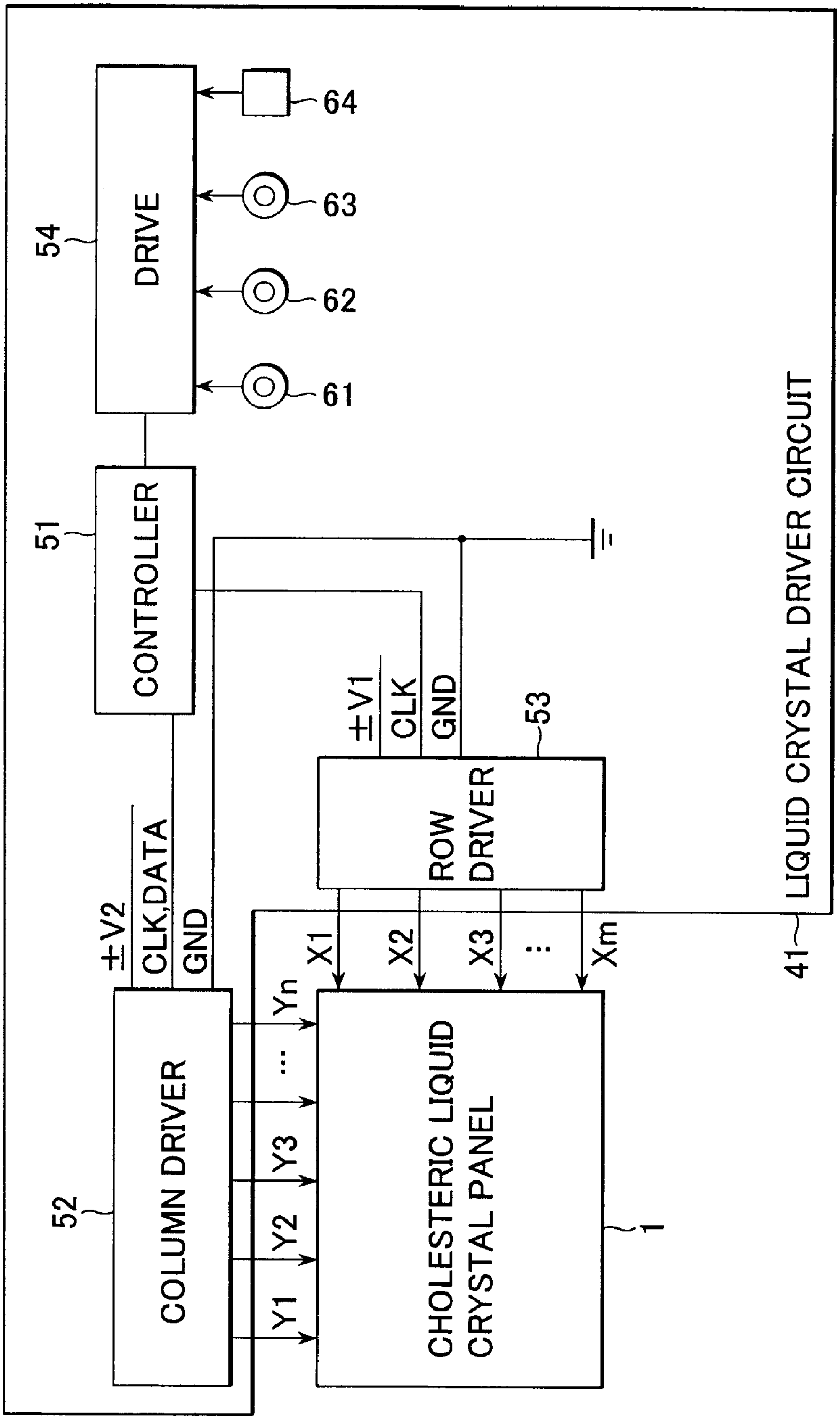
FIG. 9 is a block diagram showing a liquid crystal driver circuit according to an embodiment of the present invention.

A display apparatus (e.g., a display apparatus including a cholesteric liquid crystal panel 1 and a liquid crystal driver circuit 41 shown in FIG. 9) described in one embodiment of the present invention includes: display means (e.g., the cholesteric liquid crystal panel 1 shown in FIG. 9) for displaying information by changing a state of cholesteric liquid crystal by applying voltage to a first electrode (e.g., a transparent column electrode 12) and a second electrode (e.g., a transparent row electrode 15); first driving means (e.g., a column driver 52 shown in FIG. 9) for applying a bipolar voltage to the first electrode; and second driving means (e.g., a row driver 53 shown in FIG. 9) for applying a bipolar voltage to the second electrode, the bipolar voltage being of inverted characteristics of the bipolar voltage to be applied to the first electrode. The display apparatus further includes control means (e.g., a controller 51 shown in FIG. 9) for controlling the first driving means to apply the bipolar voltage to the first electrode a plurality of times in a predetermined period and controlling the second driving means to apply to the second electrode the bipolar voltage of the inverted characteristics of the bipolar voltage to be applied to the first electrode, at a same timing as an application of the bipolar voltage to the first electrode, so as to change a state of cholesteric liquid crystal of a predetermined pixel to a predetermined state.

The display apparatus described in another embodiment of the present invention is such that the predetermined state is a reset state (e.g., all planar reset), and the control means controls the first driving means to apply a first bipolar voltage (e.g., a voltage value V1 satisfying V1+V2>Vps) to the first electrode the plurality of times in the predetermined period and controls the second driving means to apply a second bipolar voltage (e.g., a voltage value −V2 satisfying V1+V2>Vps) to the second electrode at the same timing as an application of the first bipolar voltage to the first electrode, so as to reset a display of a predetermined pixel of the cholesteric liquid crystal.

The display apparatus described in another embodiment of the present invention is such that the predetermined state is a state (a focalconic state) of displaying information, and the control means controls the first driving means to apply a first bipolar voltage (e.g., a voltage value V3 satisfying V3+V4>Vfs) to the first electrode the plurality of times in the predetermined period and control the second driving means to apply a second bipolar voltage (e.g., a voltage value 1 V4 satisfying V3+V4>Vfs) to the second electrode at the same timing as an application of the first bipolar voltage to the first electrode, so as to change a display of a predetermined pixel of the cholesteric liquid crystal from a reset state (a planar state) to the state of displaying information.

Figure 1:
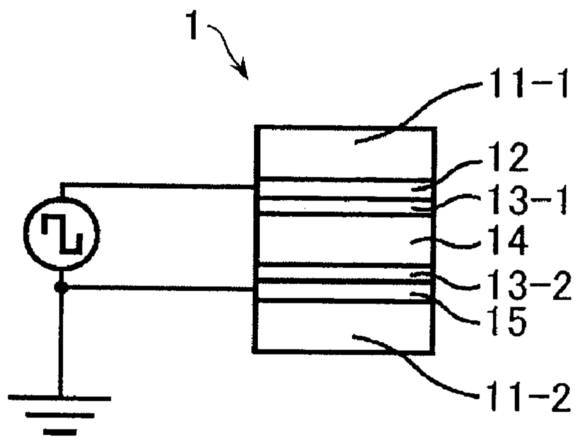
FIG. 1 is a diagram illustrating a cholesteric liquid crystal panel.
Figure 2:
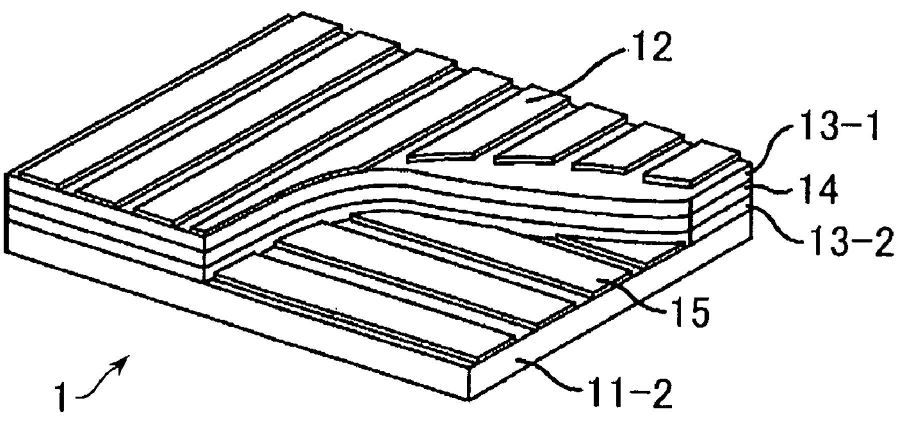
PRIOR ART FIG.2
FIG. 2 is a diagram illustrating a cholesteric liquid crystal panel.

A display method described in another embodiment of the present invention for a display apparatus having a display (e.g., the cholesteric liquid crystal panel 1 shown in FIG. 1) for displaying information in cholesteric liquid crystal by applying voltage to a first electrode (e.g., the transparent column electrode 12) and a second electrode (e.g., the transparent row electrode 15). The display method includes a first voltage application step (a process at Step S2 shown in FIG. 12, at Step S11 shown in FIG. 15 or at Step S21 or Step S22 shown in FIG. 22) of applying a first bipolar voltage to a first electrode a plurality of times in a first predetermined period and applying a second bipolar voltage to a second electrode at a same timing as an application of the first bipolar voltage to the first electrode, the second bipolar voltage being of inverted characteristics of the first bipolar voltage.

The display method described in another embodiment of the present invention further includes a second voltage application step (a process at Step S1 shown in FIG. 12 or at Step S12 shown in FIG. 15) of applying to the first electrode (e.g., he transparent column electrode 12) a third bipolar voltage different from the first and second bipolar voltages once in a second predetermined period different from the first predetermined period and applying to the second electrode a fourth bipolar voltage of the inverted characteristics of the third bipolar voltage at a same timing as an application of the third bipolar voltage to the first electrode.

The display method described in another embodiment of the present invention further includes a second voltage application step (a process at Step S21 or Step S22 shown in FIG. 18) of applying to the first electrode (e.g., the transparent column electrode 12) a third bipolar voltage different from the first and second bipolar voltages a plurality of times in a second predetermined period different from the first predetermined period and applying to the second electrode a fourth bipolar voltage of the inverted characteristics of the third bipolar voltage at a same timing as an application of the third bipolar voltage to the first electrode.

A liquid crystal driver circuit (e.g., the liquid crystal driver circuit 41 shown in FIG. 9) for driving a liquid crystal display device (e.g., the cholesteric liquid crystal panel 1 shown in FIG. 1) including cholesteric liquid crystal by applying voltage to first and second electrodes. The liquid crystal driver circuit includes: first driving means (e.g., the column driver 52 shown in FIG. 9) for applying a bipolar voltage to a first electrode; second driving means (e.g., the row driver 53 shown in FIG. 9) for applying a bipolar voltage to the second electrode, the bipolar voltage being of inverted characteristics of the bipolar voltage to be applied to the first electrode; and control means (e.g., the controller 51 shown in FIG. 9) for controlling operations of the first and second driving means, wherein the control means controls the first driving means to apply the bipolar voltage to the first electrode a plurality of times in a predetermined period and controlling the second driving means to apply to the second electrode the bipolar voltage of the inverted characteristics of the bipolar voltage to be applied to the first electrode, at a same timing as an application of the bipolar voltage to the first electrode, so as to change a state of cholesteric liquid crystal of a predetermined pixel to a predetermined state.

The liquid crystal driver circuit described in another embodiment of the present invention is such that the predetermined state may is a reset state (e.g., all planar reset), and the control means controls the first driving means to apply a first bipolar voltage (e.g., the voltage value V1 satisfying V1+V2>Vps) to the first electrode the plurality of times in the predetermined period and controls the second driving means to apply a second bipolar voltage (e.g., the voltage value −V2 satisfying V1+V2>Vfs) to the second electrode at the same timing as an application of the first bipolar voltage to the first electrode, so as to reset a display of a predetermined pixel of the cholesteric liquid crystal.

The liquid crystal driver circuit described in another embodiment of the present invention is such that the predetermined state is a state (focalconic state) of displaying information, and the control means controls the first driving means to apply a first bipolar voltage (e.g., the voltage value V3 satisfying V3+V4>Vfs) to the first electrode the plurality of times in the predetermined period and controls the second driving means to apply a second bipolar voltage (e.g., the voltage value −V4 satisfying V3+V4>Vfs) to the second electrode at the same timing as an application of the first bipolar voltage to the first electrode, so as to change a display of a predetermined pixel of the cholesteric liquid crystal from a reset state (planar state) to the state of displaying information.

A liquid crystal display method described in another embodiment of the present invention is a method for a liquid crystal driver circuit (e.g., the liquid crystal driver circuit 41 shown in FIG. 9) driving a liquid crystal display device (e.g., the cholesteric liquid crystal panel 1 shown in FIG. 9) including cholesteric liquid crystal by applying voltage to a first electrode (e.g., the transparent column electrode 12) and a second electrode (e.g., the transparent row electrode 15). The liquid crystal display method includes: a first voltage application step (the process at Step S1 shown in FIG. 1, at Step S11 shown in FIG. 15, or at Step S21 or Step S22 shown in FIG. 18) of applying a first bipolar voltage to a first electrode a plurality of times in a first predetermined period and applying a second bipolar voltage to a second electrode at a same timing as an application of the first bipolar voltage to the first electrode, the second bipolar voltage being of inverted characteristics of the first bipolar voltage.

The liquid crystal driving method described in another embodiment of the present invention further includes a second voltage application step (e.g., the process at Step S1 shown in FIG. 12 or at Step S12 shown in FIG. 15) of applying to the first electrode (e.g., the transparent column electrode 12) a third bipolar voltage different from the first and second bipolar voltages once in a second predetermined period different from the first predetermined period and applying to the second electrode a fourth bipolar voltage of the inverted characteristics of the third bipolar voltage at a same timing of an application of the third bipolar voltage to the first electrode.

The liquid crystal driving method described in another embodiment of the present invention further includes a second voltage application step (the process at Step S21 or Step S22 shown in FIG. 18) of applying to the first electrode (e.g., the transparent column electrode 12) a third bipolar voltage different from the first and second bipolar voltages a plurality of times in a second predetermined period different from the first predetermined period and applying to the second electrode a fourth bipolar voltage of the inverted characteristics of the third bipolar voltage at a same timing of an application of the third bipolar voltage to the first electrode.

Embodiments of the present invention will be described with reference to the drawings.

FIG. 9 is a block diagram showing the structure of a liquid crystal driver circuit 41 embodying the present invention for driving a cholesteric liquid crystal panel 1. The cholesteric liquid crystal panel 1 and a power supply unit (e.g., a battery, which is not shown in the figure) constitute a liquid crystal display apparatus.

Like parts corresponding to the circuit of related art are represented by like reference symbols and the description thereof is omitted where appropriate.

The cholesteric liquid crystal panel 1 is similar to the cholesteric liquid crystal panel of related art described with reference to FIGS. 1 to 4.

In the cholesteric liquid crystal panel 1, when a bipolar pulse having a potential difference between pixel electrodes equal to or larger than Vps is applied, cholesteric liquid crystal in a portion corresponding to the pixel position enters the planar state so that the corresponding pixel is displayed in a first color determined by a wavelength range in which light is reflected in the planar state. In addition, in the cholesteric liquid crystal panel 1, when a bipolar pulse having a potential difference between pixel electrodes equal to or larger than Vfs is applied, cholesteric liquid crystal in a portion corresponding to the pixel position enters the focalconic state so that the corresponding pixel is displayed in a second color viewed through the liquid crystal in the focalconic state.

Description will be made assuming that a monotone of a specific wavelength color and a black color is be displayed on the cholesteric liquid crystal panel 1 by making cholesteric liquid crystal irregularly reflect light in the specific wavelength range in the planar state and coloring a portion under the cholesteric liquid crystal layer 14 in black and making the black color to be transmitted and viewed in the focalconic state. However, the first color determined by reflected light in the wavelength range in the planar state, i.e., a specific wavelength color, may be any color such as green, blue and red, and the second color viewed by transmission through liquid crystal may also be any color.

It is obvious that multi-color display may be performed by the cholesteric liquid crystal panel 1 by using a plurality of cholesteric liquid crystal layers 14 having different wavelength ranges of light reflection in the planar state.

Figure 3:
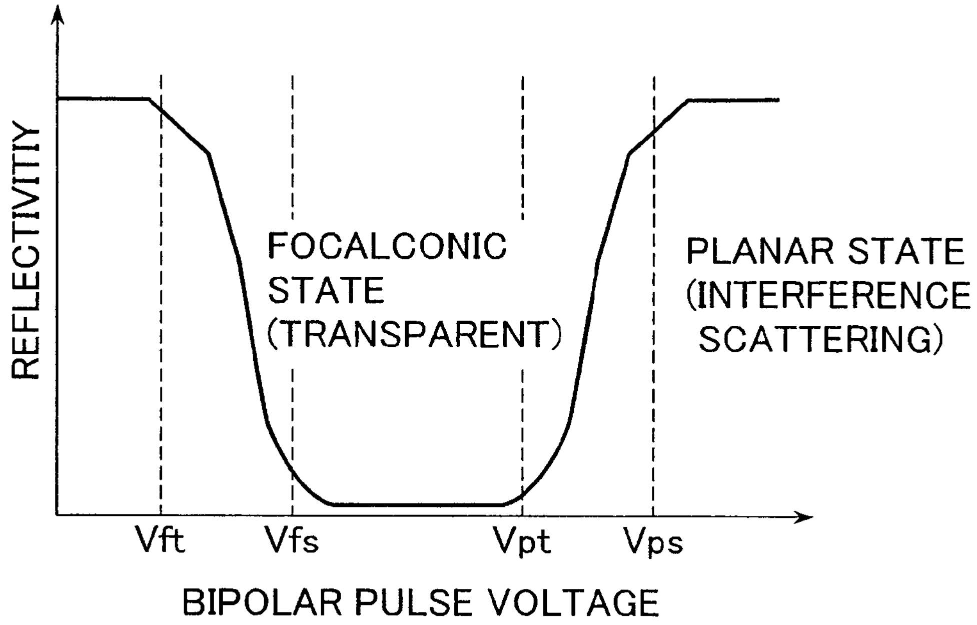
FIG. 3 is a diagram illustrating the states of cholesteric liquid crystal and an applied bipolar pulse voltage.
Figure 4:
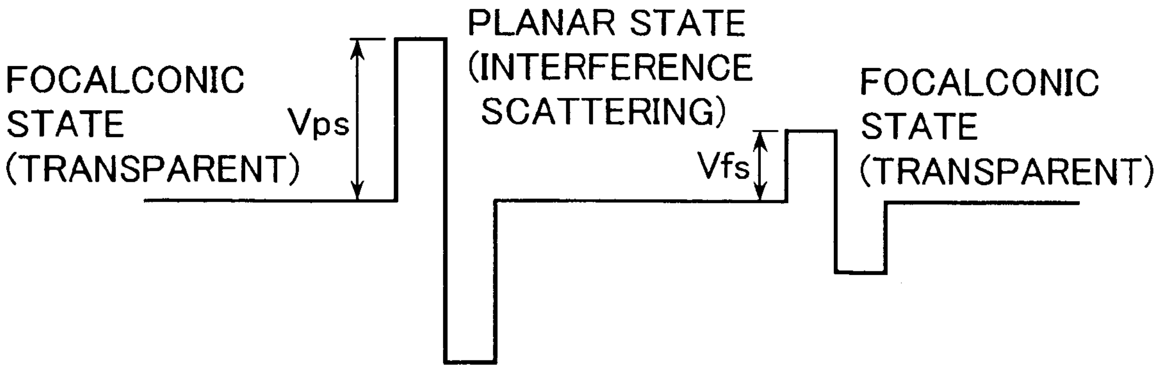
PRIOR ART FIG.4
FIG. 4 is a diagram showing a waveform for driving cholesteric liquid crystal.
Figure 5:
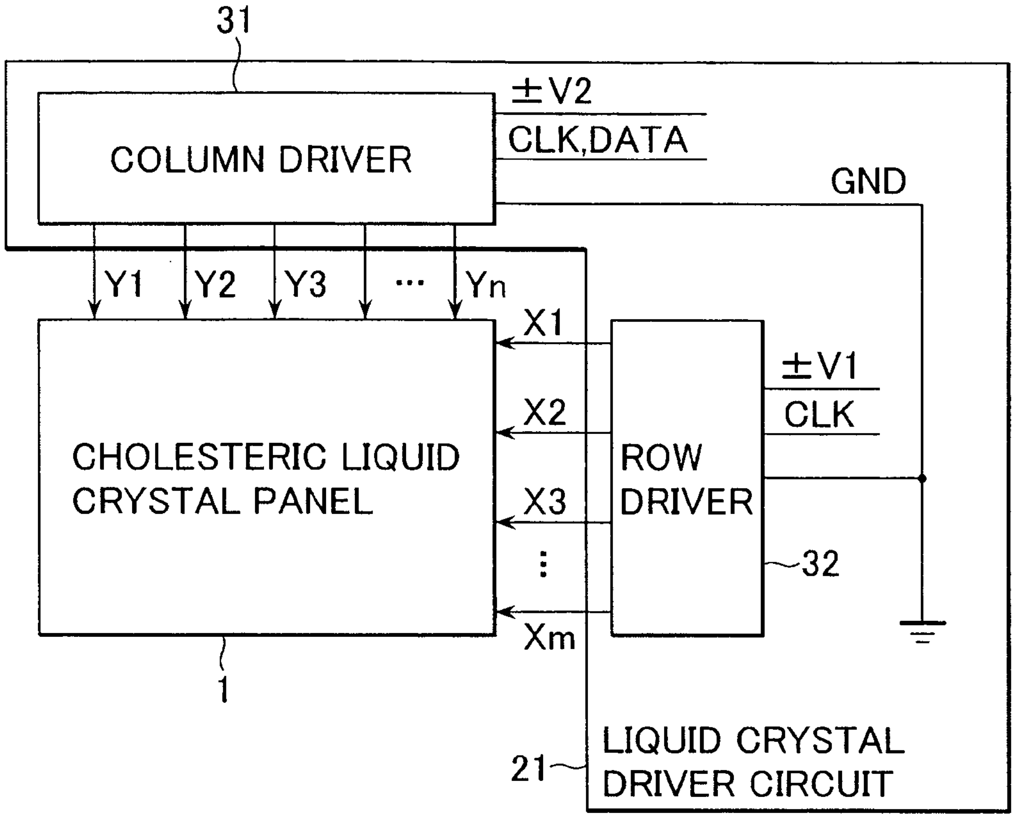
FIG. 5 is a block diagram showing a liquid crystal driver circuit of related art.

As shown in FIG. 3, a voltage value Vps of a bipolar pulse voltage necessary for changing the state of cholesteric liquid crystal to the planar state is approximately a twofold of a voltage value Vfs of a bipolar pulse voltage necessary for changing the state to the focalconic state.

In the cholesteric liquid crystal panel 1, for example, as a bipolar pulse having a voltage value Vps is applied to the whole panel area, the whole display area enters the planar state so that the displayed information is reset (all planar reset), and thereafter as a bipolar pulse having a voltage value Vfs is applied across pixel electrodes at a desired position to change to the focalconic state and display predetermined information, and if a voltage is not applied thereafter, the displayed information can be retained.

A controller 51 controls a column driver 52 and a row driver 53, supplies the column driver 52 with a clock (CLK) signal and a data (DATA) signal representative of information to be displayed on the cholesteric liquid crystal panel 2, and supplies the row driver 53 with the clock (CLK) signal.

The column driver 52 is a driver which is supplied with the clock (CLK) signal from the controller 51, connected to drive voltages ±V2 and a reference voltage GND, and applies predetermined voltages to column (signal) electrodes Y1 to Yn of the transparent column electrodes 12 of the cholesteric liquid crystal panel 1, at predetermined timings to be described later with reference to FIGS. 10, 13 and 16.

The row driver 53 is a driver which is supplied with the clock (CLK) signal from the controller 51, connected to drive voltages ±V1 and the reference voltage GND, and applies predetermined voltages to row (scan) electrodes X1 to Xm of the transparent row electrodes 15 of the cholesteric liquid crystal panel 1, at predetermined timings to be described later with reference to FIGS. 10, 13 and 16.

The controller 51 is connected to a drive 54 if necessary, and a magnetic disk 61, an optical disk 62, a magneto optical disk 63, or a semiconductor memory 64 is mounted on the drive 54 to receive and send information.

Figure 11:
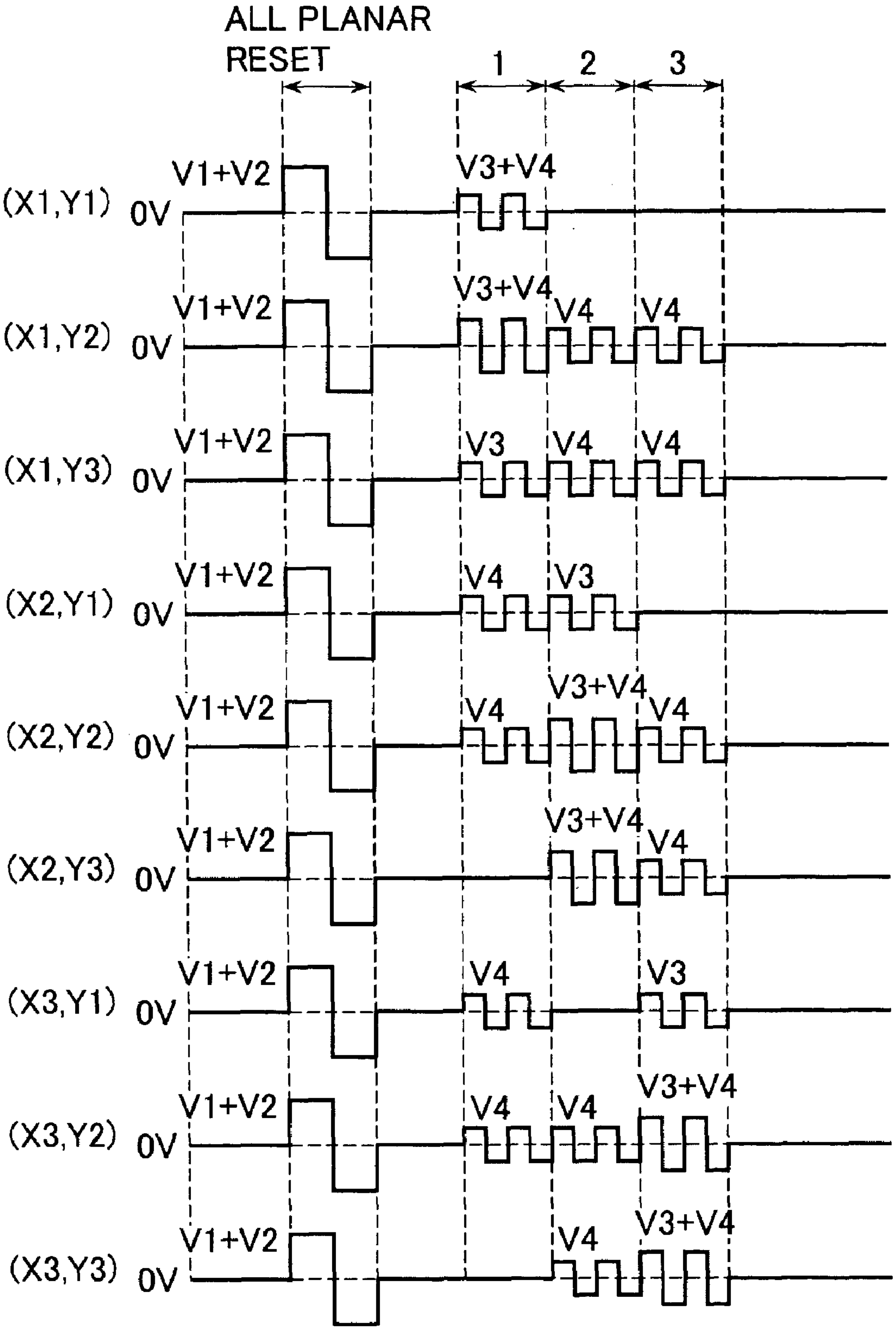
FIG. 11 is a timing chart of the first pattern showing a bipolar pulse voltage applied across electrodes of each pixel of a cholesteric liquid crystal panel from the liquid crystal driver circuit shown in FIG. 9.
Figure 12:
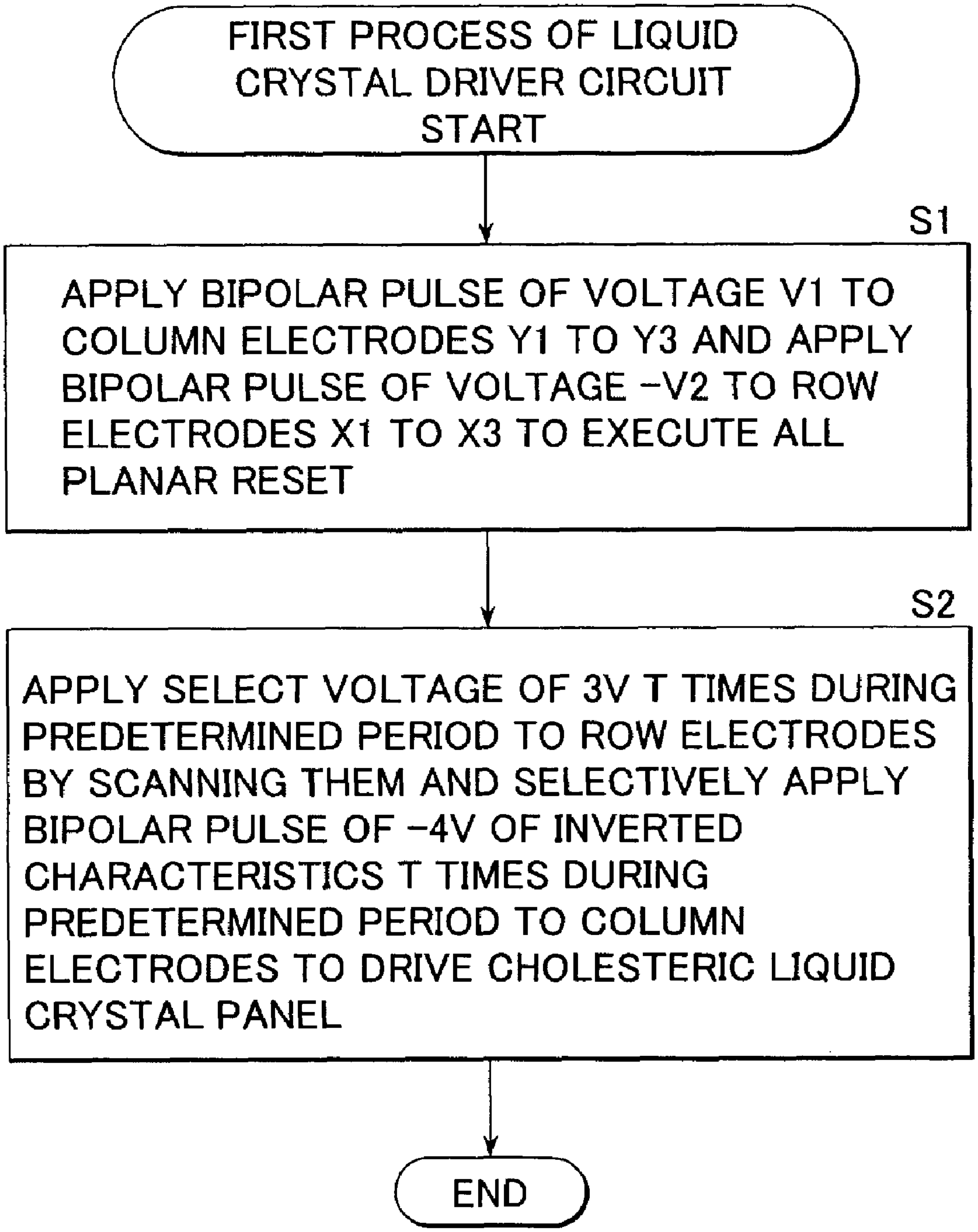
FIG. 12 is a flow chart illustrating a first process of the liquid crystal driver circuit.

Next, with reference to FIGS. 10 to 12, the first embodiment of the present invention will be described. FIGS. 10 and 11 are timing charts illustrating the operations of the column driver 52 and row driver 53 according to the first embodiment, wherein after all planar reset of the presently displayed information, six pixels (X1, Y1), (X1, Y2), (X2, Y2), (X2, Y3), (X3, Y2) and (X3, Y3) such as shown in FIG. 6 are displayed in black and the other pixels are displayed in a specific wavelength color in order to display 3×3, 9 pixels.

Figure 6:
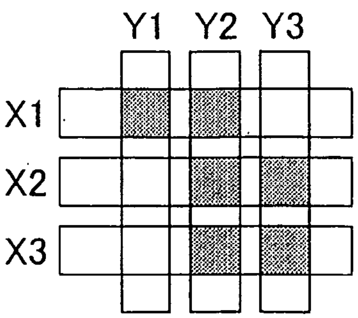
PRIOR ART FIG.6
FIG. 6 is a diagram showing an example of displayed data.
Figure 10:
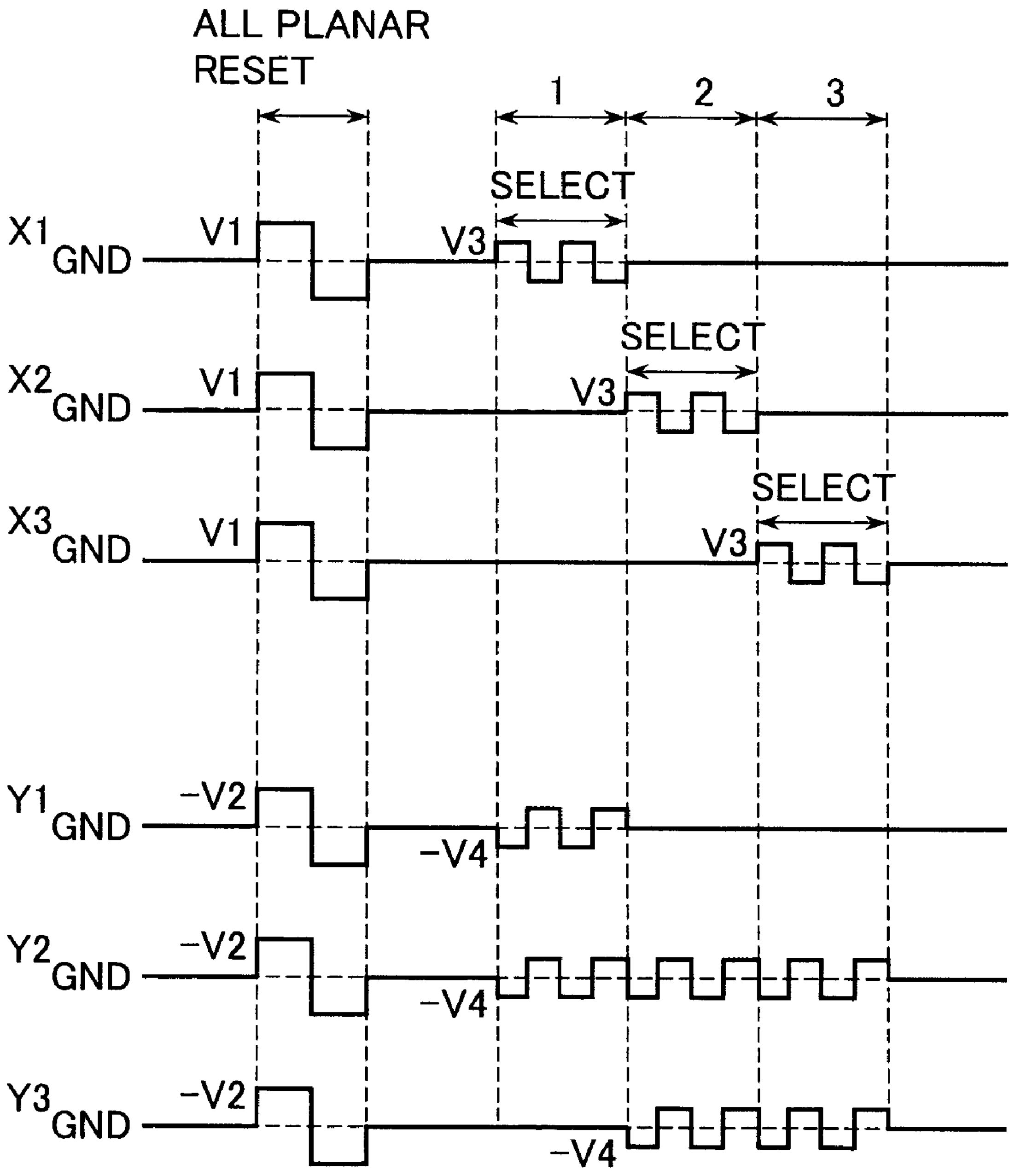
FIG. 10 is a timing chart of a first pattern showing a GND level and voltages to be applied to the row electrodes and column electrodes from the liquid crystal driver circuit shown in FIG. 9.

FIG. 10 is the timing chart illustrating voltages and timings of a bipolar pulse voltage applied to the column electrodes X1 to X3 by the column driver 52 and voltages and timings of a bipolar pulse applied to the row electrodes Y1 to Y3 by the row driver 53 in order to make the cholesteric liquid crystal 1 uniformly display information of 3×3, 9 pixels shown in FIG. 6 after all planar reset of presently displayed information. FIG. 11 is a timing chart illustrating bipolar pulses applied across pixel electrodes of (X1, Y1) to (X3, Y3) of 3×3, 9 pixels, by using the applied voltages described with reference to FIG. 10.

In order to reset presently retained information, it is necessary to apply a bipolar pulse having a voltage equal to or higher than Vps to pixels (X1, Y1) to (X3, Y3). Under the control of the controller 51, the row driver 53 applies a bipolar pulse having a voltage V1 and a predetermined time width to the row electrodes X1 to X3 and the column driver 52 applies a bipolar pulse having a voltage −V2 and a predetermined time width to the row electrodes Y1 to Y3.

Therefore, as shown in FIG. 11, a bipolar pulse of V1+V2 is applied across pixel electrodes of the pixels (X1, Y1) to (X3, Y3). Since V1+V2>Vps, the cholesteric liquid crystal layer 14 between two electrodes of the transparent column electrode 12 and transparent row electrode 15 at a corresponding pixel position enters the planar state to make a specific wavelength light be subjected to interference scattering. Namely, the pixels (X1, Y1) to (X3, Y3) are all displayed in a specific wavelength color and the state enters the all planar reset state.

As the bipolar voltage Vfs is selectively applied to a desired one of the pixels (X1, Y1) to (X3, Y3) in all planar reset, the state transits to the focalconic state so that desired information is displayed on the focalconic state panel 1. However, the light reflectivities/transmissivities of the pixels (X1, Y1) to (X3, Y3) are not uniform depending upon whether the state before all planar reset is the planar state or the focalconic state.

In order to avoid this, thereafter, under the control of the controller 51, as shown in FIG. 10 when the row driver 53 sequentially scans the row electrodes X1, X2 and X3 and applies a bipolar pulse having a voltage V3 to the row electrode, a bipolar voltage 3V is applied a plurality of times in a predetermined time (in FIG. 10, twice in a predetermined time) when each row electrode is selected. Under the control of the controller 51, as shown in FIG. 10 the column driver 52 selectively applies a bipolar pulse −V4 of inverse characteristics to the column electrodes Y1 to Y3 in correspondence with the select timing of each row electrode.

Specifically, while the row electrode X1 is selected and a bipolar voltage 3V is applied thereto a plurality of times in a predetermined time (in FIG. 10, twice in the predetermined time), the column driver 52 applies a bipolar pulse −V4 of the inverse characteristics to the column electrodes Y1 and Y2 at the same timing as the select pulse applied to the row electrode X1, applies the bipolar pulse −V4 of the inverse characteristics to the column electrodes Y2 and Y3 at the same timing as the select pulse applied to the row electrode X2 while the row electrode X2 is selected and the bipolar voltage 3V is applied thereto the plurality of times in the predetermined time (in FIG. 10, twice in the predetermined time), and applies the bipolar pulse −V4 of the inverse characteristics to the column electrodes Y2 and Y3 at the same timing as the select pulse applied to the row electrode X3 while the row electrode X3 is selected and the bipolar voltage 3V is applied thereto the plurality of times in the predetermined time (in FIG. 10, twice in the predetermined time).

As shown in FIG. 11, since the bipolar pulse voltage of V3+V4>Vfs is applied the plurality of times (in FIG. 11, twice) in the predetermined time, across the pixel electrodes of the row and column electrodes to which the bipolar pulses are applied at the same timing, the cholesteric liquid crystal layer 14 between the two electrodes, the transparent column electrode 12 and transparent row electrode 15, at the corresponding pixel position enters the uniform focalconic state irrespective of the state before the all planer reset state, and becomes transparent (the state having a uniform transmissivity). Namely, the selected six pixels (X1, Y1), (X1, Y2), (X2, Y2), (X2, Y3), (X3, Y2) and (X3, Y3) are displayed in black uniformly, and the other pixel displays remain in the specific wavelength color.

In FIGS. 10 and 11, although the number of repetitive voltage applications in the time having the predetermined period is shown as twice, it is obvious that the number of repetitive voltage applications in the time having the predetermined period may be any number of times equal to or lager than twice. The values of the voltage repetitively applied to change the state to the focalconic state are preferably set the same in order to make constant the light transmissivity of the pixel entered the focalconic state.

The time duration of the predetermined period is properly determined from the speed necessary for information display and the time taken to drive liquid crystal. How many times the bipolar voltage can be applied in the predetermined time width to change the liquid crystal state to the focalconic state, is determined from the response speed of liquid crystal relative to voltage. Namely, if one application time of voltage is made extremely short in order to apply the bipolar voltage several times in the predetermined time, the liquid crystal may not be able to respond the applied voltage so that the state transition is not possible. The voltage application time necessary for the liquid crystal to respond becomes different depending upon the viscosity of liquid crystal and the gap thickness of liquid crystal.

In order to realize a uniform display, it is better to increase the number of repetitive application times of the bipolar voltage during the predetermined period width, and to this end, it is preferable to prolong the predetermined time width. However, as the predetermined time width is prolonged, the information display completion speed lowers. It is therefore preferable to properly set the predetermined time width and the number of repetitive applications of voltage in accordance with the required display performance.

Since the bipolar pulse is applied in the manner like the first embodiment from the liquid crystal driver circuit 41 embodying the present invention, the uniformity of displayed information can be improved, because it is possible to display desired pixels in uniform black (or another designated color) irrespective of the state before all planar reset, by applying the bipolar voltage for transition to the focalconic state a plurality of times in a predetermined time and maintaining the other pixel displays in the specific wavelength color of light reflected in the planar state.

In this manner, in the liquid crystal display apparatus equipped with the liquid crystal driver circuit 41 embodying the present invention, irrespective of the state before each pixel resetting, it is possible to invert the display color of an arbitrary pixel from the specific wavelength color of light reflected in the planar state to the uniform black (or another predetermined color).

Next, with reference to the flow chart shown in FIG. 12, description will be made on a first process of the liquid crystal driver circuit 41 of the liquid crystal display apparatus applying the present invention.

At Step S1 the controller 51 controls the column driver 52 to apply the bipolar pulse having the voltage V1 to the column electrodes Y1 to Y3, and controls the row driver 53 to apply the bipolar pulse having the voltage −V2 to the row electrodes X1 to X3. In this manner, all planar reset is executed.

At Step S2 the controller 51 controls the row driver 53 to scan the row electrodes and apply the select voltage 3V thereto T times in a predetermined period, and controls the column driver 52 to selectively apply the bipolar pulse −4V of the inverse characteristics T times in the predetermined period synchronously with the timing of scan/application to the row electrode, to thereby change the liquid crystal at only a desired pixel position to the focalconic state, display desired information, and terminate the process.

For example, as the column driver 52 applies voltage to the column electrodes Y1 to Y3 of the transparent column electrodes 12 of the cholesteric liquid crystal panel 1 and the row driver 53 applies voltage to the row electrodes X1 to X3 of the transparent row electrodes 15, respectively at the timings described with reference to FIG. 10, the bipolar pulse voltage shown in FIG. 11 is applied across the pixel electrodes corresponding to the pixels (X1, Y1) to (X3, Y3). Therefore, after all planar reset of 3×3, 9 pixels of the cholesteric liquid crystal panel 1, the bipolar pulse for state transition to the focalconic state is applied to six pixels (X1, Y1), (X1, Y2), (X2, Y2), (X2, Y3), (X3, Y2) and (X3, Y3) twice, so that the liquid crystals at the corresponding pixel positions become transparent more uniformly than a case of the related art. Therefore, the pixels desired by a user are displayed in uniform black (or another predetermined color) and the other pixels are displayed in the specific wavelength color of light reflected in the planar state.

With these processes, the liquid crystal display apparatus using cholesteric liquid crystal capable of retaining information once displayed without a power supply can change a display color of an arbitrary pixel from the specific wavelength color to another uniform color irrespective of the state of each pixel before resetting.

Next, with reference to FIGS. 13 to 15, the second embodiment of the present invention will be described.

Figure 13:
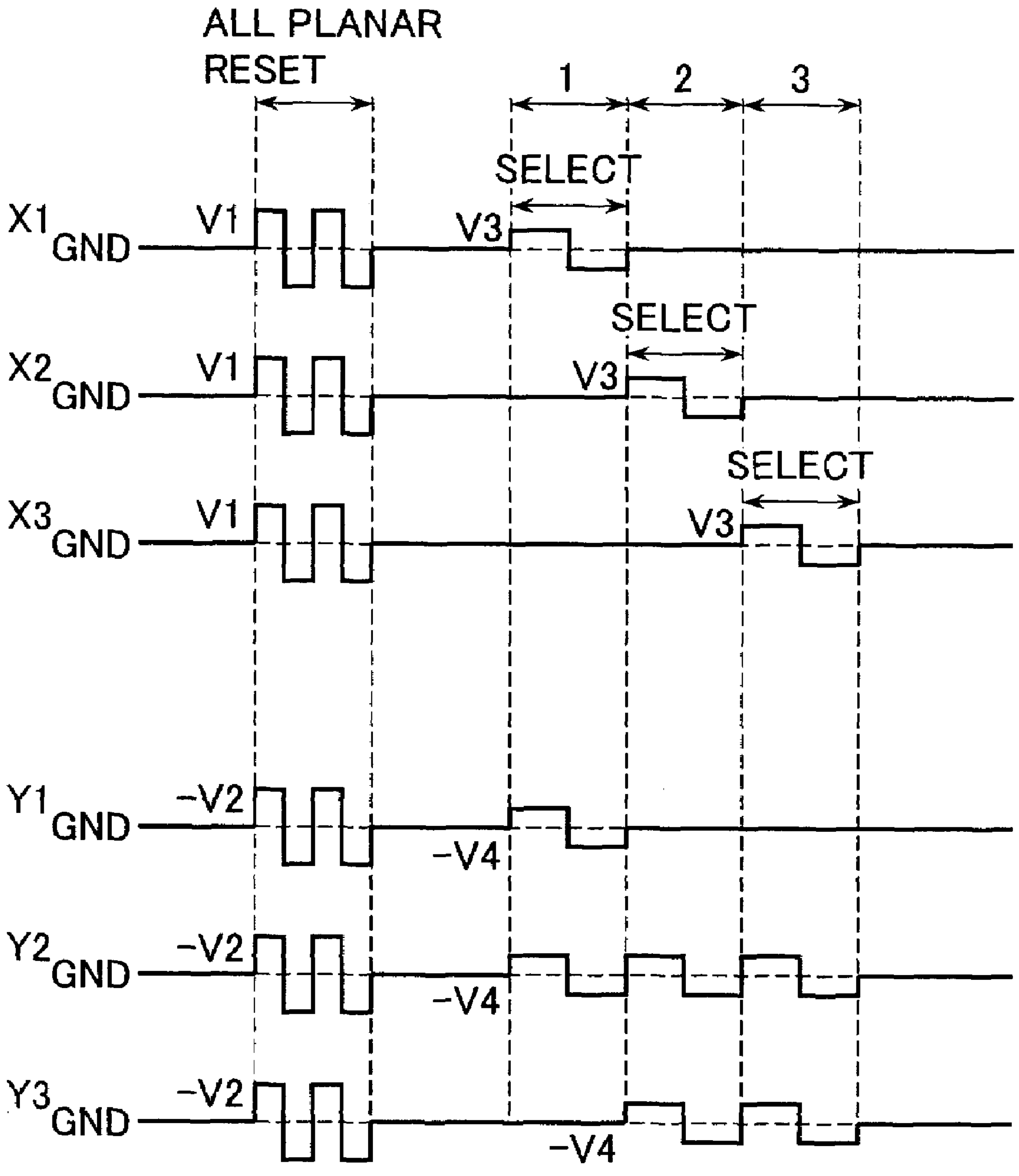
FIG. 13 is a timing chart of a second pattern showing a GND level and voltages to be applied to the row electrodes and column electrodes from the liquid crystal driver circuit shown in FIG. 9.
Figure 14:
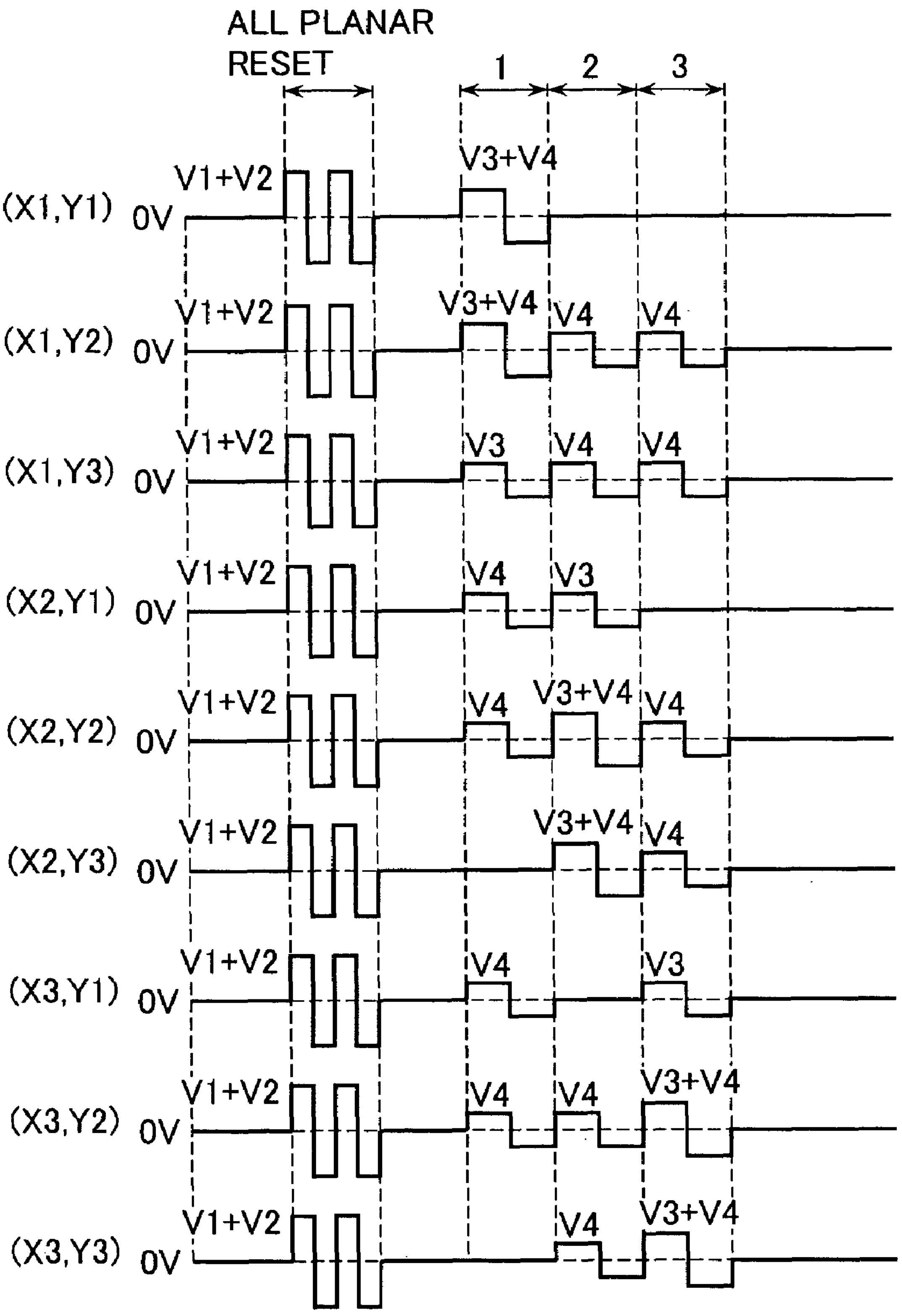
FIG. 14 is a timing chart of the second pattern showing a bipolar pulse voltage applied across electrodes of each pixel of a cholesteric liquid crystal panel from the liquid crystal driver circuit shown in FIG. 9.

FIGS. 13 and 14 are timing charts illustrating the operations of the column driver 52 and row driver 53 according to the second embodiment, wherein after all planar reset of the presently displayed information, six pixels (X1, Y1), (X1, Y2), (X2, Y2), (X2, Y3), (X3, Y2) and (X3, Y3) such as shown in FIG. 6 are displayed in black and the other pixels are displayed in a specific wavelength color in order to display 3×3, 9 pixels.

FIG. 13 is the timing chart illustrating voltages and timings of a bipolar pulse voltage applied to the column electrodes X1 to X3 by the column driver 52 and voltages and timings of a bipolar pulse applied to the row electrodes Y1 to Y3 by the row driver 53 in order to make the cholesteric liquid crystal 1 display information of 3×3, 9 pixels shown in FIG. 6 after all planar reset of presently displayed information. FIG. 14 is a timing chart illustrating bipolar pulses applied across pixel electrodes of (X1, Y1) to (X3, Y3) of 3×3, 9 pixels, by using the applied voltages described with reference to FIG. 13.

Figure 7:
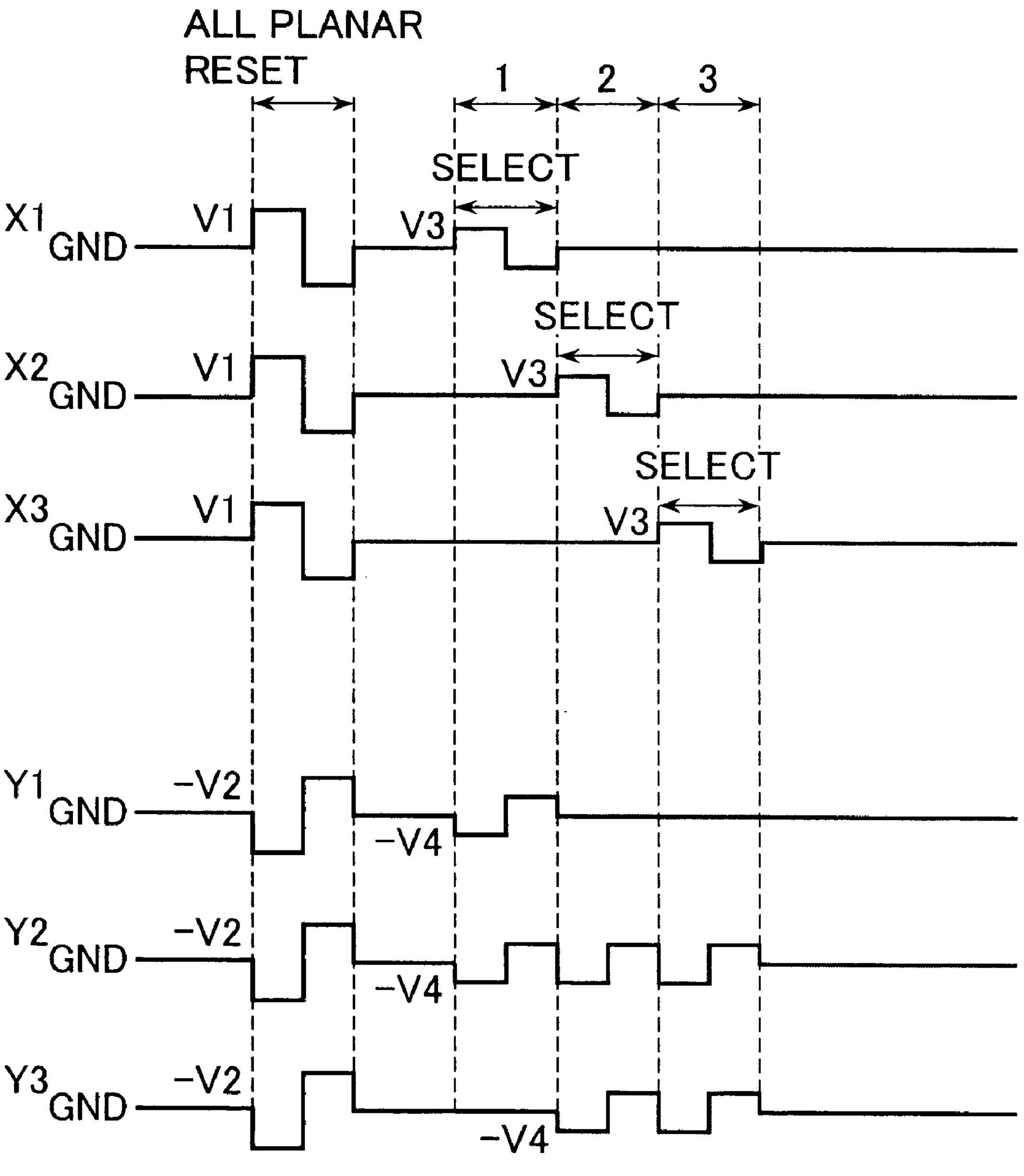
FIG. 7 is a timing chart showing voltages applied to row electrodes and column electrodes of the liquid crystal driver circuit shown in FIG. 5.
Figure 8:
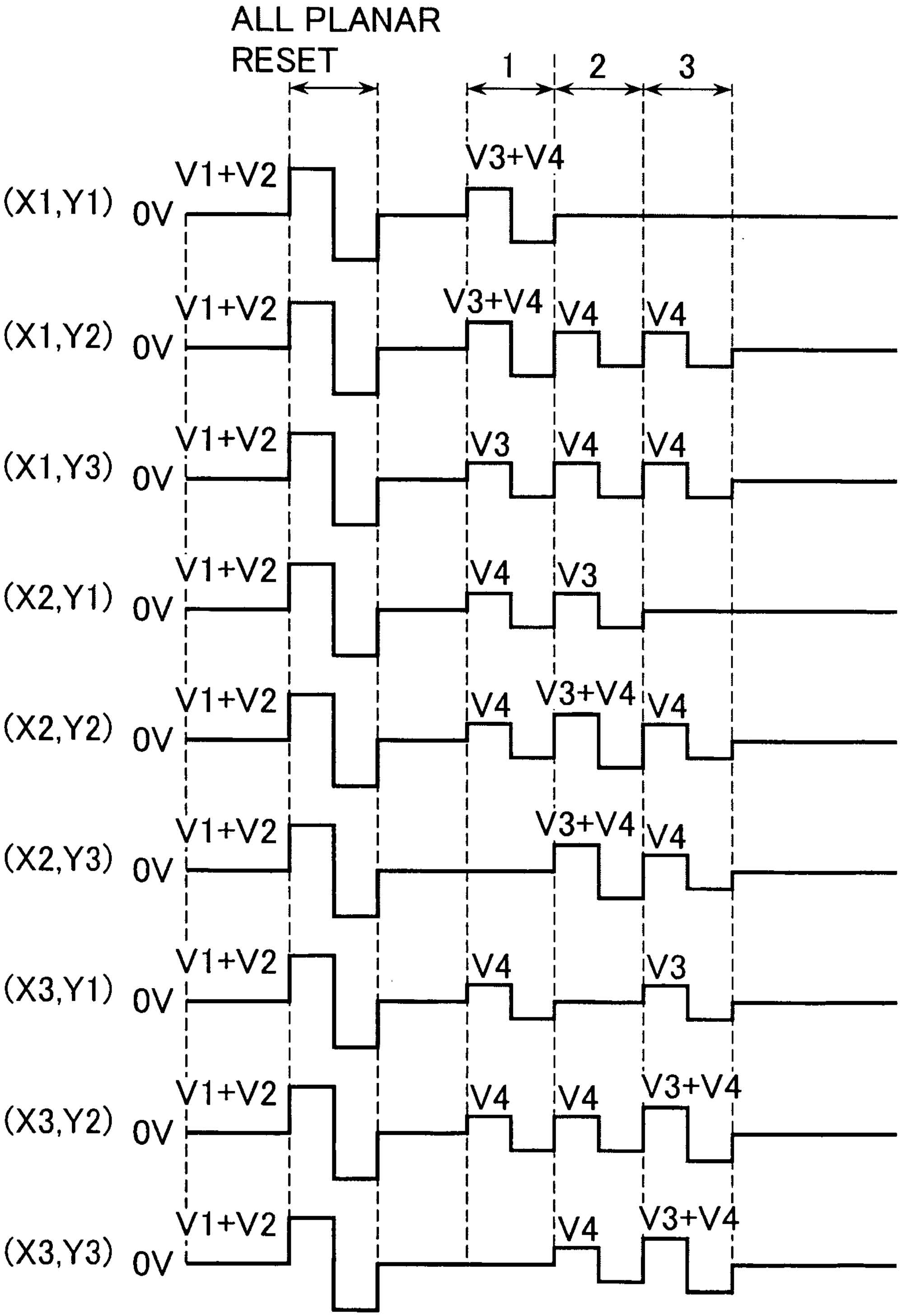
FIG. 8 is a timing chart showing bipolar pulse voltages applied across electrodes to row electrodes and column electrodes from the liquid crystal driver circuit shown in FIG. 5 of a cholesteric liquid crystal panel.

In order to reset presently retained information, it is necessary to apply a bipolar pulse having a voltage equal to or higher than Vps to the pixels (X1, Y1) to (X3, Y3). As in the case of related art described with reference to FIGS. 7 and 8, even if all planar reset is executed by applying one bipolar pulse in a predetermined period, the transmissivity of liquid crystal in the planar state which should not transmit light becomes slightly different. To avoid this, under the control of the controller 51, the row driver 53 applies a bipolar pulse having a voltage V1 to the row electrodes X1 to X3 a plurality of times (in FIG. 13, twice) in a predetermined time width and the column driver 52 applies a bipolar pulse having a voltage −V2 to the row electrodes Y1 to Y3 a plurality of times (in FIG. 13, twice) in the predetermined time width at the same timing as voltage application to the row electrode.

Therefore, as shown in FIG. 14, a bipolar pulse of V1+V2 is applied across pixel electrodes of the pixels (X1, Y1) to (X3, Y3) twice in the predetermined period. Since V1+V2>Vps, the cholesteric liquid crystal layer 14 between two electrodes of the transparent column electrode 12 and transparent row electrode 15 at a corresponding pixel position enters the planar state having a more uniform reflectivity irrespective of whether the state at each pixel position before resetting is the planar state or the focalconic state to make a specific wavelength light be subjected to interference scattering. Namely, the pixels (X1, Y1) to (X3, Y3) are all displayed in a specific wavelength color and the state enters the all planar reset state.

Thereafter, under the control of the controller 51, as shown in FIG. 10 the row driver 53 sequentially scans the row electrodes X1, X2 and X3 and applies a bipolar pulse having a voltage V3 to the row electrode to select one of the row electrodes. Under the control of the controller 51, as shown in FIG. 13 the column driver 52 selectively applies a bipolar pulse −V4 of inverse characteristics to the column electrodes Y1 to Y3 in correspondence with the select timing of each row electrode. Specifically, while the row electrode X1 is selected, the column driver 52 applies a bipolar pulse −V4 of the inverse characteristics to the column electrodes Y1 and Y2, while the row electrode X2 is selected, applies the bipolar pulse −V4 of the inverse characteristics to the column electrodes Y2 and Y3, and while the row electrode X3 is selected, applies the bipolar pulse −V4 of the inverse characteristics to the column electrodes Y2 and Y3.

As shown in FIG. 14, since the bipolar pulse voltage of V3+V4>Vfs is applied across the pixel electrodes of the row and column electrodes to which the bipolar pulses are applied at the same timing, the cholesteric liquid crystal layer 14 between the two electrodes, the transparent column electrode 12 and transparent row electrode 15, at the corresponding pixel position enters the focalconic state and becomes transparent. Namely, the selected six pixels (X1, Y1), (X1, Y2), (X2, Y2), (X2, Y3), (X3, Y2) and (X3, Y3) are displayed in black, and the other pixel displays remain in the specific wavelength color.

The time duration of the predetermined period is properly determined from the speed necessary for information display and the time taken to drive liquid crystal. How many times the bipolar voltage can be applied in the predetermined time width to execute all planar reset and change the liquid crystal state of all pixels to the planer state, is determined from the response speed of liquid crystal relative to voltage. Namely, if one application time of voltage is made extremely short in order to apply the bipolar voltage several times in the predetermined time, the liquid crystal may not be able to respond the applied voltage so that the state transition is not possible. The voltage application time necessary for the liquid crystal to respond becomes different by the viscosity of liquid crystal and the gap thickness of liquid crystal. The values of voltages repetitively applied to execute all planar reset are preferably the same in order to make constant the light reflectivity at the reset display screen.

Since the bipolar pulse is applied in the manner like the second embodiment from the liquid crystal driver circuit 41 embodying the present invention, the display can be set to the all planar reset state uniformly irrespective of the state before resetting each pixel. The display contrast can be improved more than a case of the related art.

Next, with reference to the flow chart shown in FIG. 15, description will be made on a second process of the liquid crystal driver circuit 41 of the liquid crystal display apparatus applying the present invention.

At Step S11 the controller 51 controls the column driver 52 to apply the bipolar pulse having the voltage V1 to the column electrodes Y1 to Y3 T times in a predetermined period, and controls the row driver 53 to apply the bipolar pulse having the voltage −V2 to the row electrodes X1 to X3 T times in the predetermined period. In this manner, all planar reset is executed.

At Step S12 the controller 51 controls the row driver 53 to scan the row electrodes and apply the select voltage 3V thereto and controls the column driver 52 to selectively apply the bipolar pulse −4V of the inverse characteristics synchronously with the timing of scan/application to the row electrode, to thereby drive the cholesteric liquid crystal panel, change the liquid crystal at only a desired pixel position to the focalconic state, display desired information, and terminate the process.

Figure 15:
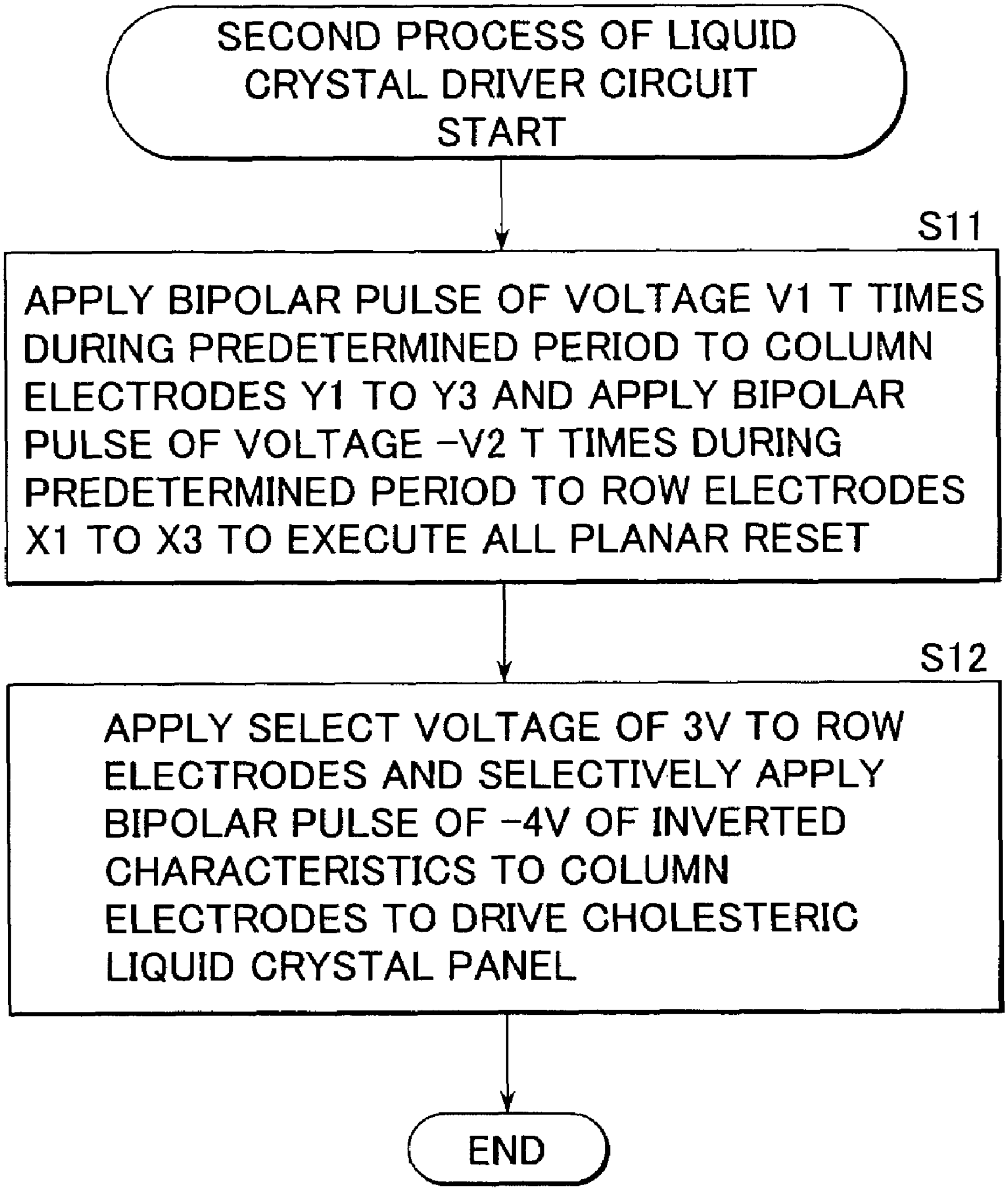
FIG. 15 is a flow chart illustrating a second process of the liquid crystal driver circuit.

For example, as the column driver 52 applies voltage to the column electrodes Y1 to Y3 of the transparent column electrodes 12 of the cholesteric liquid crystal panel 1 and the row driver 53 applies voltage to the row electrodes X1 to X3 of the transparent row electrodes 15, respectively at the timings described with reference to FIG. 14, the bipolar pulse voltage shown in FIG. 15 is applied during all planar reset twice in the predetermined time across the pixel electrodes corresponding to the pixels (X1, Y1) to (X3, Y3). Therefore, after all planar reset of 3×3, 9 pixels of the cholesteric liquid crystal panel 1 to have a uniform reflectivity at all pixel positions, the bipolar pulse for state transition to the focalconic state is applied to six pixels (X1, Y1), (X1, Y2), (X2, Y2), (X2, Y3), (X3, Y2) and (X3, Y3), so that the corresponding liquid crystals become transparent. Therefore, the pixels desired by a user are displayed in a predetermined color such as black and the other pixels are displayed in the specific wavelength color of light reflected in the planar state.

With these processes, the liquid crystal display apparatus using cholesteric liquid crystal capable of retaining information once displayed without a power supply can reset the display in a more uniform state.

Next, with reference to FIGS. 16 to 18, the third embodiment of the present invention will be described.

Figure 16:
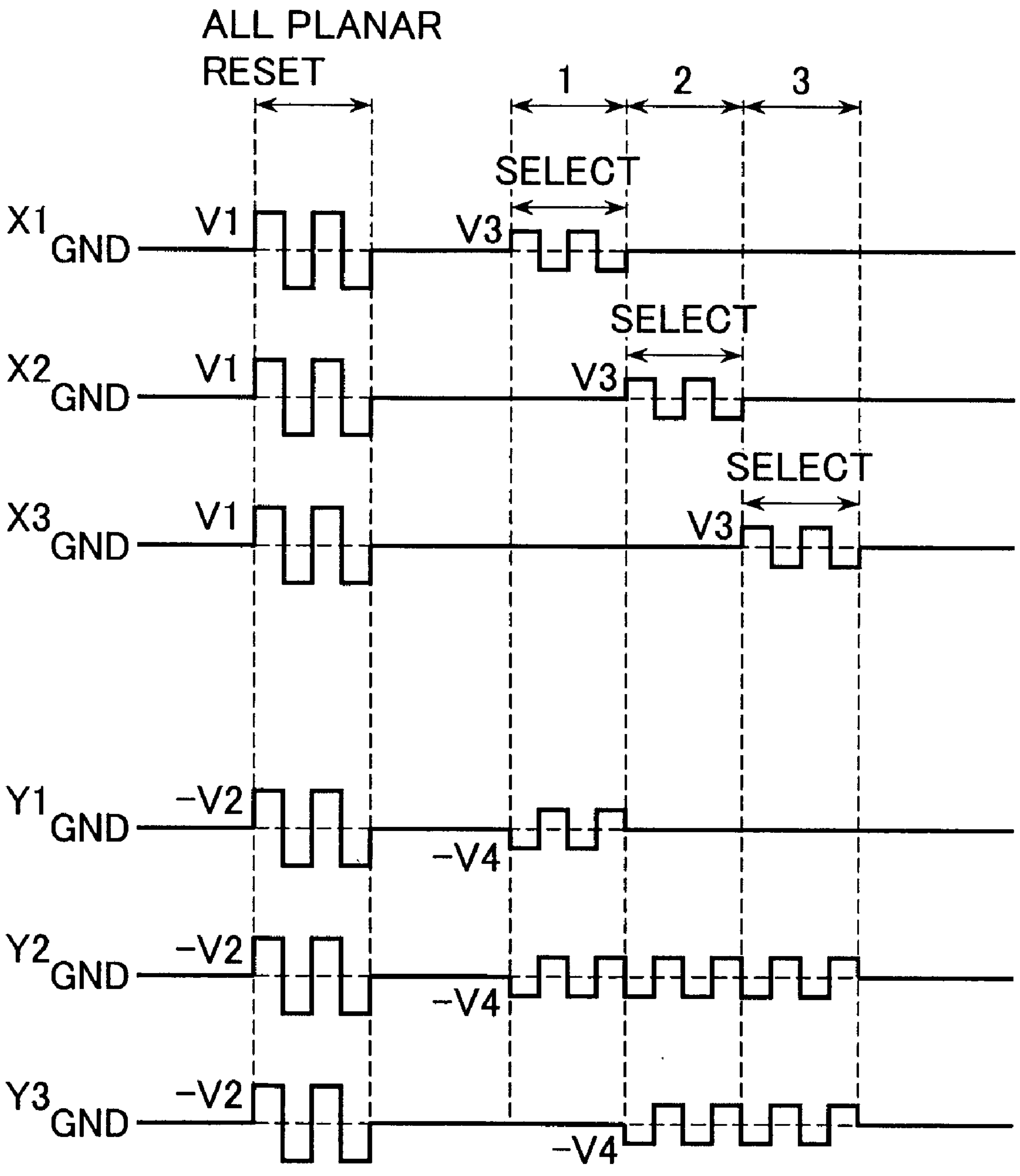
FIG. 16 is a timing chart of a third pattern showing a GND level and voltages to be applied to the row electrodes and column electrodes from the liquid crystal driver circuit shown in FIG. 9.
Figure 17:
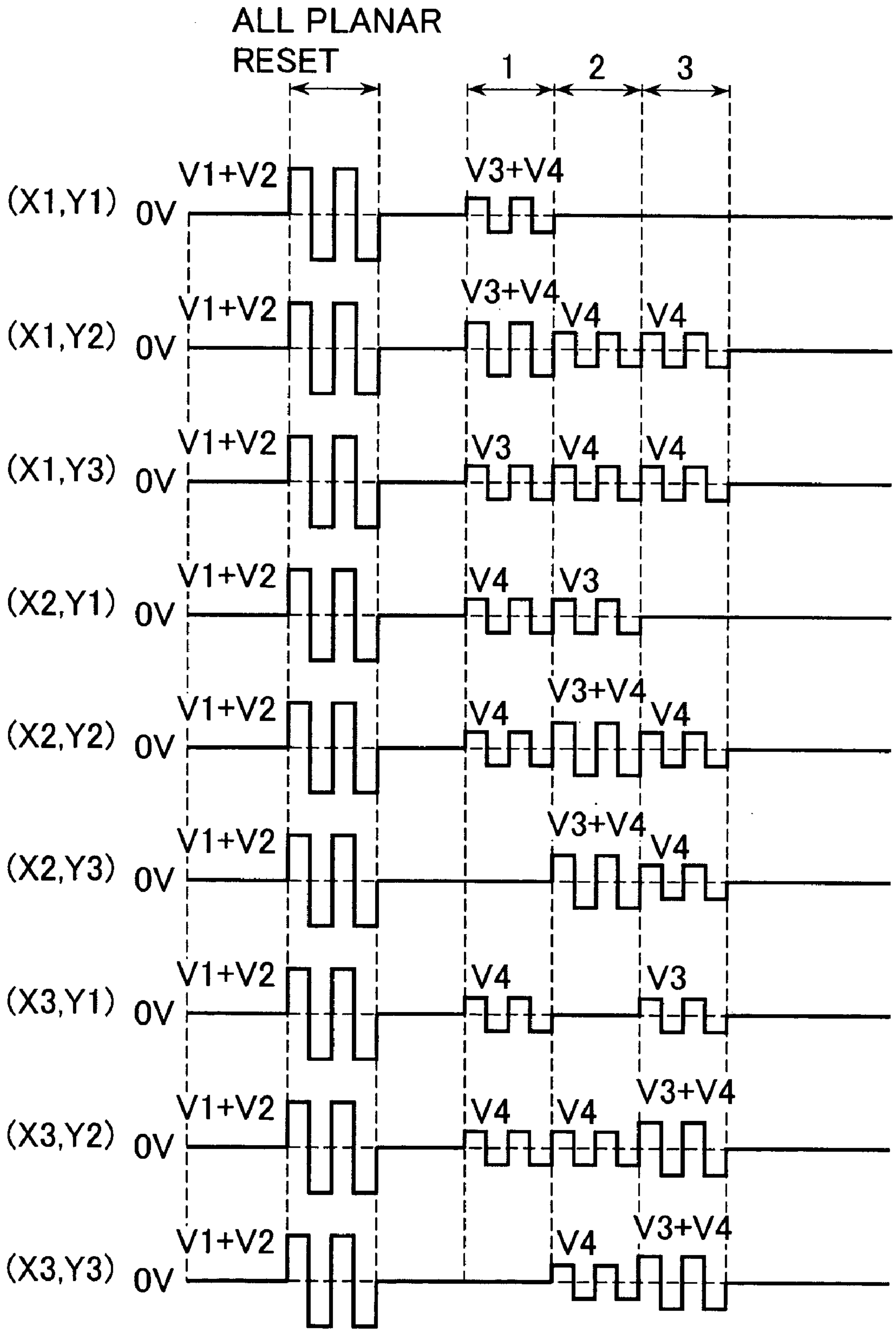
FIG. 17 is a timing chart of the third pattern showing a bipolar pulse voltage applied across electrodes of each pixel of a cholesteric liquid crystal panel from the liquid crystal driver circuit shown in FIG. 9.

FIGS. 16 and 17 are timing charts illustrating the operations of the column driver 52 and row driver 53 according to the third embodiment, wherein after all planar reset of the presently displayed information, six pixels (X1, Y1), (X1, Y2), (X2, Y2), (X2, Y3), (X3, Y2) and (X3, Y3) such as shown in FIG. 6 are displayed in black and the other pixels are displayed in a specific wavelength color in order to display 3×3, 9 pixels.

FIG. 16 is the timing chart illustrating voltages and timings of a bipolar pulse voltage applied to the column electrodes X1 to X3 by the column driver 52 and voltages and timings of a bipolar pulse applied to the row electrodes Y1 to Y3 by the row driver 53 in order to make the cholesteric liquid crystal 1 display information of 3×3, 9 pixels shown in FIG. 6 after all planar reset of presently displayed information. FIG. 17 is a timing chart illustrating bipolar pulses applied across pixel electrodes of (X1, Y1) to (X3, Y3) of 3×3, 9 pixels, by using the applied voltages described with reference to FIG. 16.

A uniform and high contrast display of the cholesteric liquid crystal 1 can be realized, in the first embodiment by applying a bipolar voltage across electrodes of a desired pixel among pixels subjected to all planar reset a plurality of times in a predetermined period to change the state to the focalconic state, and in the second embodiment by applying a bipolar voltage across electrodes of all pixels a plurality of times in a predetermined period to execute all planar reset. In the third embodiment, the contrast of information to be displayed on the cholesteric liquid crystal 1 and the display uniformity can be improved further by applying a plurality of times in a predetermined period both a bipolar pulse having a voltage equal to or higher than Vps to the pixels (X1, Y1) to (X3, Y3) in order to reset information presently retained and a bipolar pulse having a voltage Vfs to a predetermined pixel to display desired information by changing the state of a desired pixel.

Namely, in order to reset presently retained information, it is necessary to apply a bipolar pulse having a voltage equal to or higher than Vps to the pixels (X1, Y1) to (X3, Y3). Under the control of the controller 51, the row driver 53 applies a bipolar pulse having a voltage V1 to the row electrodes X1 to X3 a plurality of times (in FIG. 16, twice) in a predetermined time width and the column driver 52 applies a bipolar pulse having a voltage −V2 to the row electrodes Y1 to Y3 a plurality of times (in FIG. 16, twice) in the predetermined time width at the same timing as voltage application to the row electrode.

Therefore, as shown in FIG. 17, a bipolar pulse of V1+V2 is applied across pixel electrodes of the pixels (X1, Y1) to (X3, Y3) twice in the predetermined period. Since V1+V2>Vps, the cholesteric liquid crystal layer 14 between two electrodes of the transparent column electrode 12 and transparent row electrode 15 at a corresponding pixel position enters the more uniform planar state to make a specific wavelength light be subjected to interference scattering. Namely, the pixels (X1, Y1) to (X3, Y3) are all displayed in a specific wavelength color and the state enters the uniform all planar reset state.

Thereafter, under the control of the controller 51, as shown in FIG. 16 the row driver 53 sequentially scans the row electrodes X1, X2 and X3 and applies a bipolar pulse having a voltage V3 to the row electrode the plurality of times (in FIG. 16, twice) in the predetermined period to select one of the row electrodes. Under the control of the controller 51, as shown in FIG. 16 the column driver 52 selectively applies a bipolar pulse −V4 of inverse characteristics to the column electrodes Y1 to Y3 the plurality of times (in FIG. 16, twice) in the predetermined time in correspondence with the select timing of each row electrode. Specifically, while the row electrode X1 is selected, the column driver 52 applies a bipolar pulse −V4 of the inverse characteristics to the column electrodes Y1 and Y2, while the row electrode X2 is selected, applies the bipolar pulse −V4 of the inverse characteristics to the column electrodes Y2 and Y3, and while the row electrode X3 is selected, applies the bipolar pulse −V4 of the inverse characteristics to the column electrodes Y2 and Y3.

As shown in FIG. 17, since the bipolar pulse voltage of V3+V4>Vfs is applied twice in the predetermined period across the pixel electrodes of the row and column electrodes to which the bipolar pulses are applied at the same timing, the cholesteric liquid crystal layer 14 between the two electrodes, the transparent column electrode 12 and transparent row electrode 15, at the corresponding pixel position enters the focalconic state and becomes transparent. Namely, the selected six pixels (X1, Y1), (X1, Y2), (X2, Y2), (X2, Y3), (X3, Y2) and (X3, Y3) are displayed in a specific color such as black, and the other pixel displays remain in the specific color of light reflected in the planar state.

The time duration of the predetermined period is properly determined from the speed necessary for information display and the time taken to drive liquid crystal. How many times the bipolar voltage can be applied in the predetermined time width to execute all planar reset by changing the liquid crystal state of all pixels to the planer state, is determined from the response speed of liquid crystal relative to voltage. Namely, if one application time of voltage is made extremely short in order to apply the bipolar voltage several times in the predetermined time, the liquid crystal may not be able to respond the applied voltage so that the state transition is not possible. The voltage application time necessary for the liquid crystal to respond becomes different depending upon the viscosity of liquid crystal and the gap thickness of liquid crystal.

Since the bipolar pulse is applied in the manner like the third embodiment from the liquid crystal driver circuit 41 embodying the present invention, in all planar reset, resetting can be executed uniformly irrespective of the state before resetting each pixel. The pixels subjected to transition to the focalconic state each have a uniform transmissivity so that the display contrast and uniformity can be improved.

Next, with reference to the flow chart shown in FIG. 18, description will be made on a first process of the liquid crystal driver circuit 41 of the liquid crystal display apparatus applying the present invention.

At Step S21 the controller 51 controls the column driver 52 to apply the bipolar pulse having the voltage V1 to the column electrodes Y1 to Y3 T times in a predetermined period, and controls the row driver 53 to apply the bipolar pulse having the voltage −V2 to the row electrodes X1 to X3 T times in the predetermined period. In this manner, all planar reset is executed.

At Step S22 the controller 51 controls the row driver 53 to scan the row electrodes and apply the select voltage 3V thereto T times in the predetermined period, and controls the column driver 52 to selectively apply the bipolar pulse −4V of the inverse characteristics T times in the predetermined period synchronously with the timing of scan/application to the row electrode, to thereby drive the cholesteric liquid crystal panel, change the liquid crystal at only a desired pixel position to the focalconic state, display desired information, and terminate the process.

For example, as the column driver 52 applies voltage to the column electrodes Y1 to Yn of the transparent column electrodes 12 of the cholesteric liquid crystal panel 1 and the row driver 53 applies voltage to the row electrodes X1 to Xm of the transparent row electrodes 15, respectively at the timings described with reference to FIG. 16, the bipolar pulse voltage shown in FIG. 17 is applied across the pixel electrodes corresponding to the pixels (X1, Y1) to (X3, Y3). Therefore, after all planar reset of 3×3, 9 pixels of the cholesteric liquid crystal panel 1 to have a uniform reflectivity at all pixel positions, the bipolar pulse for state transition to the focalconic state is applied to six pixels (X1, Y1), (X1, Y2), (X2, Y2), (X2, Y3), (X3, Y2) and (X3, Y3) twice, so that the corresponding liquid crystals become transparent. Therefore, the pixels desired by a user are displayed in a uniform black color and the other pixels are displayed in a uniform specific wavelength color.

Figure 18:
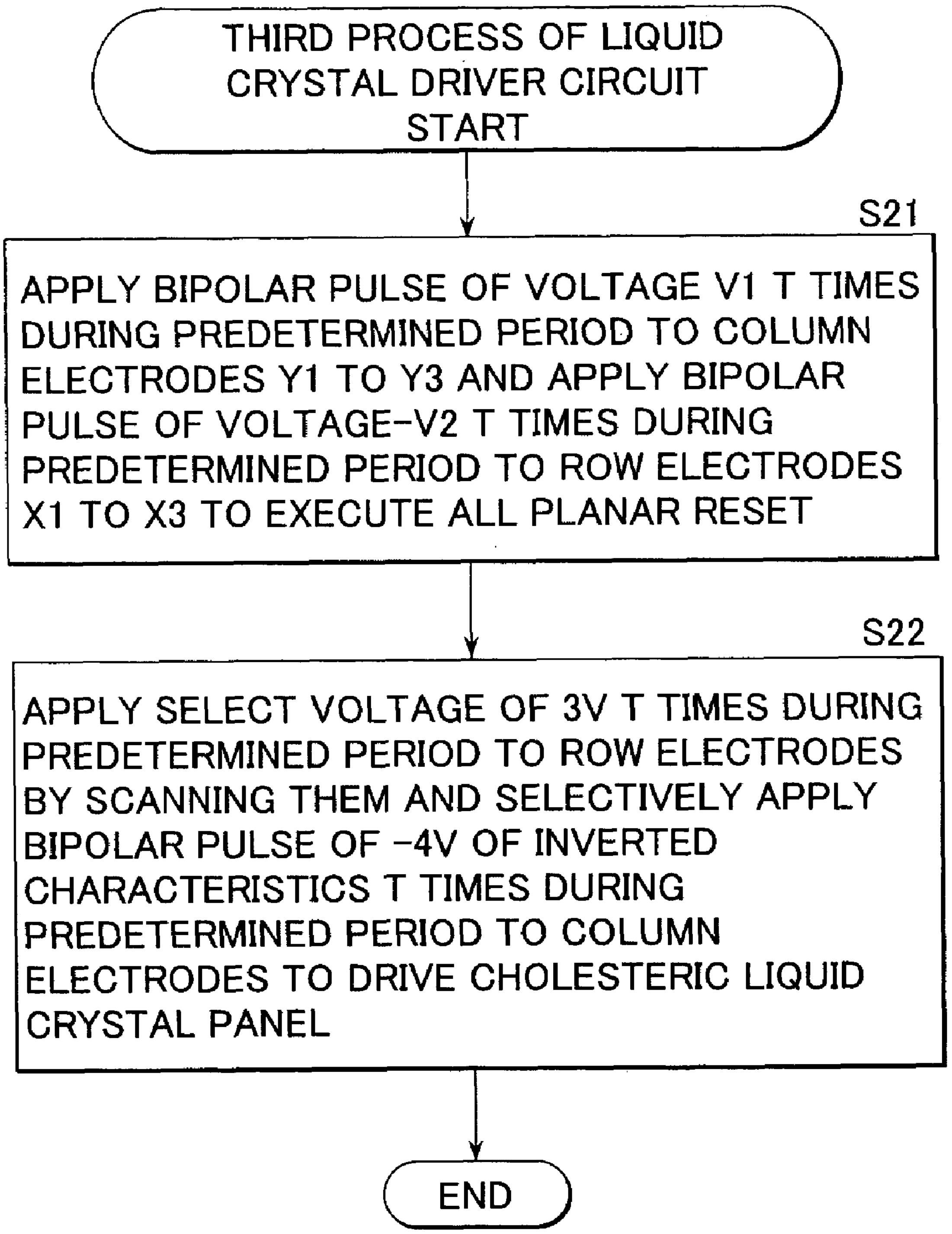
FIG. 18 is a flow chart illustrating a third process of the liquid crystal driver circuit.

In the flow chart shown in FIG. 18, the bipolar voltage applied at Step S21 for all planar reset and the bipolar voltage applied at Step S22 for transition of liquid crystal to the focalconic state are both applied T times in the predetermined period. However, the bipolar voltage applied at Step S21 for all planar reset and the bipolar voltage applied at Step S22 for transition of liquid crystal to the focalconic state may be applied different times equal to or larger than twice.

With these processes, the liquid crystal display apparatus using cholesteric liquid crystal capable of retaining information once displayed without a power supply can have a display with a more uniform contrast and a more clear quality.

Although the two-color display has been described, it is obvious that the present invention is applicable to a multicolor display of a liquid crystal apparatus using cholesteric liquid crystal.

A series of processes described above may be executed by software. Programs constituting the software can be installed from a storage medium into a computer built in dedicated hardware or into a general personal computer capable of executing various functions by installing various programs.

The storage medium may be as shown in FIG. 9 the magnetic disk 61 (including a flexible disk), the optical disk 62 (including a CD-ROM (Compact Disk-Read Only Memory), a DVD (Digital Versatile Disk)), the magneto optical disk 63 (including an MD (Mini-Disk)(trademark)), or the semiconductor memory 64, respectively storing the programs.

In this specification, steps describing a program to be recorded in a storage medium obviously include the processes to be executed time sequentially in the order of description, and also include the processes not necessarily executed time sequentially but executed in parallel or individually.

It should be understood by those skilled in the art that various modifications, combinations, sub-combinations and alterations may occur depending on design requirements and other factors insofar as they are within the scope of the appended claims or the equivalents thereof.

What is claimed is:

1. A display method for a display apparatus having a display for displaying information by applying voltage to a first electrode and a second electrode, the display method comprising:

a first voltage application step of applying a first bipolar voltage to a first electrode a plurality of times in a first predetermined period and applying a second bipolar voltage to a second electrode at a same timing as an application of the first bipolar voltage to the first electrode, the second bipolar voltage being of inverted characteristics of the first bipolar voltage; and a second voltage application step of applying to the first electrode a third bipolar voltage different from the first and second bipolar voltages once in a second predetermined period different from the first predetermined period and applying to the second electrode a fourth bipolar voltage of inverted characteristics of the third bipolar voltage at a same timing as an application of the third bipolar voltage to the first electrode.

2. A liquid crystal display method for a liquid crystal driver circuit driving a liquid crystal display device including cholesteric liquid crystal by applying voltage to a first electrode and a second electrode, the method comprising:

a first voltage application step of applying a first bipolar voltage to a first electrode a plurality of times in a first predetermined period and applying a second bipolar voltage to a second electrode at a same timing as an application of the first bipolar voltage to the first electrode, the second bipolar voltage being of inverted characteristics of the first bipolar voltage; and a second voltage application step of applying to the first electrode a third bipolar voltage different from the first and second bipolar voltages once in a second predetermined period different from the first predetermined period and applying to the second electrode a fourth bipolar voltage of inverted characteristics of the third bipolar voltage at a same timing of an application of the third bipolar voltage to the first electrode.

* * * * *

UNITED STATES PATENT AND TRADEMARK OFFICE

CERTIFICATE OF CORRECTION

PATENT NO. : 7,379,059 B2
APPLICATION NO. : 11/000242
DATED : May 27, 2008
INVENTOR(S) : Noboru Toyozawa et al.

It is certified that error appears in the above-identified patent and that said Letters Patent is hereby corrected as shown below:

Front Page:
Item (54) should read:
-- DISPLAY APPARATUS --.

Column 13, Line 37:
"insulating, wherein" should read -- insulating substrate, wherein --.

Signed and Sealed this

Thirtieth Day of September, 2008

JON W. DUDAS
*Director of the United States Patent and Trademark Office*

UNITED STATES PATENT AND TRADEMARK OFFICE

CERTIFICATE OF CORRECTION

PATENT NO. : 7,379,059 B2
APPLICATION NO. : 11/000242
DATED : May 27, 2008
INVENTOR(S) : Ryota Odake et al.

It is certified that error appears in the above-identified patent and that said Letters Patent is hereby corrected as shown below:

This certificate supersedes the Certificate of Correction issued September 30, 2008. The certificate should be vacated since no Certificate of Correction was granted for this patent number.

Signed and Sealed this

Eighteenth Day of November, 2008

JON W. DUDAS
*Director of the United States Patent and Trademark Office*